United States Patent
Alderucci

(10) Patent No.: US 9,875,341 B2
(45) Date of Patent: *Jan. 23, 2018

(54) ACCESSING INFORMATION ASSOCIATED WITH A MOBILE GAMING DEVICE TO VERIFY THE MOBILE GAMING DEVICE IS IN COMMUNICATIONS WITH AN INTENDED SERVER

(75) Inventor: Dean P. Alderucci, Westport, CT (US)

(73) Assignee: CFPH, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/104,080

(22) Filed: May 10, 2011

(65) Prior Publication Data

US 2011/0212772 A1  Sep. 1, 2011

Related U.S. Application Data

(63) Continuation of application No. 11/560,136, filed on Nov. 15, 2006, now Pat. No. 7,942,742.

(51) Int. Cl.
| | |
|---|---|
| G06F 21/10 | (2013.01) |
| G06F 21/32 | (2013.01) |
| G06F 12/14 | (2006.01) |
| G06Q 20/40 | (2012.01) |
| G07F 17/32 | (2006.01) |

(52) U.S. Cl.
CPC .......... *G06F 21/10* (2013.01); *G06F 12/1458* (2013.01); *G06F 21/105* (2013.01); *G06F 21/32* (2013.01); *G06Q 20/401* (2013.01); *G07F 17/32* (2013.01); *G07F 17/3223* (2013.01); *G07F 17/3232* (2013.01); *G07F 17/3241* (2013.01)

(58) Field of Classification Search
CPC ...... G06F 21/00; G06F 12/1458; G06F 17/32; G06F 17/3244; G06F 21/105; G06F 21/32; H04W 12/06; G07F 17/32; G07F 17/3244
USPC .................................. 726/3, 26; 463/29, 42
See application file for complete search history.

(56) References Cited

U.S. PATENT DOCUMENTS

| | | | |
|---|---|---|---|
| 6,309,307 B1 | 10/2001 | Krause et al. | |
| 6,331,148 B1 | 12/2001 | Krause et al. | |
| 6,488,585 B1 | 12/2002 | Wells | |
| 6,508,710 B1 * | 1/2003 | Paravia et al. | 463/42 |

(Continued)

FOREIGN PATENT DOCUMENTS

| | | |
|---|---|---|
| EP | 1480102 A2 | 11/2004 |
| GB | 2408659 | 6/2005 |

(Continued)

OTHER PUBLICATIONS

Akkawi, Amjad, et al. "A mobile gaming platform for the IMS." Proceedings of 3rd ACM SIGCOMM workshop on Network and system support for games. ACM, 2004. (pp. 77-84).*

(Continued)

*Primary Examiner* — Kari Schmidt

(57) ABSTRACT

To verify that a mobile gaming device is in communications with an intended server that provides activities and/or services to a player through the mobile gaming device and maintains information related to these activities and/or services, a verification server determines one or more pieces of the maintained information and sends the determined information to a verification device as a confirmation that the mobile gaming device is in communication with the intended server.

28 Claims, 9 Drawing Sheets

(56) References Cited

U.S. PATENT DOCUMENTS

| | | | |
|---|---|---|---|
| 6,884,166 B2 | 4/2005 | Leen et al. | |
| 6,887,151 B2 | 5/2005 | Leen et al. | |
| 6,887,159 B2 | 5/2005 | Leen et al. | |
| 6,899,628 B2 | 5/2005 | Leen et al. | |
| 6,949,022 B1 | 9/2005 | Showers | |
| 6,962,530 B2 | 11/2005 | Jackson | |
| 6,966,832 B2 | 11/2005 | Leen et al. | |
| 6,979,267 B2 | 12/2005 | Leen et al. | |
| 7,021,623 B2 | 4/2006 | Leen et al. | |
| 7,029,394 B2 | 4/2006 | Leen et al. | |
| 7,144,011 B2 | 12/2006 | Asher et al. | |
| 7,174,565 B2 | 2/2007 | Kadyk et al. | |
| 7,191,151 B1 | 3/2007 | Nosek | |
| 7,207,885 B2 | 4/2007 | Longman | |
| 7,231,659 B2* | 6/2007 | Trilli et al. | 726/3 |
| 7,233,922 B2 | 6/2007 | Asher et al. | |
| 7,263,076 B1 | 8/2007 | Leibovitz et al. | |
| 7,306,514 B2 | 12/2007 | Amaitis et al. | |
| 7,311,606 B2 | 12/2007 | Amaitis et al. | |
| 7,341,517 B2 | 3/2008 | Asher et al. | |
| 7,401,235 B2 | 7/2008 | Mowers et al. | |
| 7,442,124 B2 | 10/2008 | Asher et al. | |
| 7,452,273 B2 | 11/2008 | Amaitis et al. | |
| 7,452,274 B2 | 11/2008 | Amaitis et al. | |
| 7,458,891 B2 | 12/2008 | Asher et al. | |
| 7,534,169 B2* | 5/2009 | Amaitis et al. | 463/39 |
| 7,562,034 B2 | 7/2009 | Asher et al. | |
| 7,566,270 B2 | 7/2009 | Amaitis et al. | |
| 7,577,847 B2* | 8/2009 | Nguyen | G06Q 20/3224 380/231 |
| 7,611,409 B2* | 11/2009 | Muir et al. | 463/29 |
| 7,828,652 B2 | 11/2010 | Nguyen et al. | |
| 7,942,742 B2* | 5/2011 | Alderucci | 463/29 |
| 8,135,648 B2 | 3/2012 | Oram | |
| 8,191,121 B2* | 5/2012 | Ruppert et al. | 726/5 |
| 8,287,375 B2 | 10/2012 | Byng | |
| 8,353,764 B2* | 1/2013 | Williams | G06F 21/36 463/16 |
| 9,064,373 B2 | 6/2015 | Alderucci | |
| 9,590,965 B2 | 3/2017 | Alderucci | |
| 9,685,036 B2 | 6/2017 | Alderucci | |
| 9,767,640 B2 | 9/2017 | Alderucci | |
| 2002/0073021 A1 | 6/2002 | Ginsberg et al. | |
| 2002/0094869 A1 | 7/2002 | Harkham | |
| 2002/0120722 A1 | 8/2002 | Kutaragi et al. | |
| 2002/0157019 A1 | 10/2002 | Kadyk et al. | |
| 2002/0198044 A1 | 12/2002 | Walker | |
| 2003/0013527 A1 | 1/2003 | Rowe et al. | |
| 2003/0018913 A1 | 1/2003 | Brezak et al. | |
| 2003/0028762 A1 | 2/2003 | Trilli et al. | |
| 2003/0045358 A1 | 3/2003 | Leen et al. | |
| 2003/0060280 A1 | 3/2003 | Oles et al. | |
| 2003/0087701 A1* | 5/2003 | Paravia et al. | 463/42 |
| 2003/0109310 A1 | 6/2003 | Heaton et al. | |
| 2003/0176213 A1* | 9/2003 | LeMay | G07F 17/32 463/20 |
| 2003/0176218 A1* | 9/2003 | LeMay | G07F 17/32 463/25 |
| 2003/0195841 A1 | 10/2003 | Ginsberg et al. | |
| 2003/0212806 A1* | 11/2003 | Mowers et al. | 709/229 |
| 2003/0229789 A1 | 12/2003 | Morais et al. | |
| 2003/0236120 A1* | 12/2003 | Reece et al. | 463/42 |
| 2004/0009812 A1 | 1/2004 | Scott et al. | |
| 2004/0122962 A1* | 6/2004 | DiFalco | H04L 29/06 709/229 |
| 2004/0127277 A1* | 7/2004 | Walker et al. | 463/16 |
| 2004/0192438 A1 | 9/2004 | Wells | |
| 2004/0193469 A1 | 9/2004 | Amaitis et al. | |
| 2004/0193531 A1 | 9/2004 | Amaitis et al. | |
| 2004/0198483 A1 | 10/2004 | Amaitis et al. | |
| 2004/0210756 A1 | 10/2004 | Mowers et al. | |
| 2004/0243504 A1 | 12/2004 | Asher et al. | |
| 2004/0243849 A1 | 12/2004 | Blackburn et al. | |
| 2004/0250135 A1 | 12/2004 | Haddad et al. | |
| 2004/0259633 A1* | 12/2004 | Gentles et al. | 463/29 |
| 2004/0259640 A1* | 12/2004 | Gentles et al. | 463/42 |
| 2004/0266533 A1* | 12/2004 | Gentles et al. | 463/42 |
| 2005/0003888 A1 | 1/2005 | Asher et al. | |
| 2005/0027643 A1 | 2/2005 | Amaitis et al. | |
| 2005/0049949 A1 | 3/2005 | Asher et al. | |
| 2005/0064934 A1 | 3/2005 | Amaitis et al. | |
| 2005/0097320 A1 | 5/2005 | Golan et al. | |
| 2005/0170886 A1 | 8/2005 | Miller | |
| 2005/0181862 A1 | 8/2005 | Asher et al. | |
| 2005/0181870 A1 | 8/2005 | Nguyen et al. | |
| 2005/0187000 A1 | 8/2005 | Miller | |
| 2005/0187020 A1* | 8/2005 | Amaitis et al. | 463/42 |
| 2005/0197190 A1* | 9/2005 | Amaitis et al. | 463/42 |
| 2005/0239523 A1 | 10/2005 | Longman et al. | |
| 2005/0239524 A1 | 10/2005 | Longman et al. | |
| 2005/0245306 A1 | 11/2005 | Asher et al. | |
| 2005/0245308 A1 | 11/2005 | Amaitis et al. | |
| 2005/0283609 A1 | 12/2005 | Langford | |
| 2006/0005024 A1 | 1/2006 | Law | |
| 2006/0009279 A1 | 1/2006 | Amaitis et al. | |
| 2006/0030402 A1 | 2/2006 | Chandrakumar et al. | |
| 2006/0035707 A1 | 2/2006 | Nguyen et al. | |
| 2006/0064588 A1 | 3/2006 | Tidwell et al. | |
| 2006/0085641 A1 | 4/2006 | Multerer et al. | |
| 2006/0085862 A1 | 4/2006 | Witt et al. | |
| 2006/0095790 A1* | 5/2006 | Nguyen et al. | 713/186 |
| 2006/0116198 A1 | 6/2006 | Leen et al. | |
| 2006/0116199 A1 | 6/2006 | Leen et al. | |
| 2006/0116200 A1 | 6/2006 | Leen et al. | |
| 2006/0121991 A1 | 6/2006 | Borinik et al. | |
| 2006/0135252 A1 | 6/2006 | Amaitis et al. | |
| 2006/0165060 A1 | 7/2006 | Dua | |
| 2006/0183522 A1 | 8/2006 | Leen et al. | |
| 2006/0205497 A1 | 9/2006 | Wells et al. | |
| 2006/0211472 A1 | 9/2006 | Walker | |
| 2006/0211473 A1 | 9/2006 | Walker | |
| 2006/0211474 A1 | 9/2006 | Walker | |
| 2006/0217176 A1 | 9/2006 | Walker et al. | |
| 2006/0247063 A1 | 11/2006 | Takahashi et al. | |
| 2006/0252526 A1 | 11/2006 | Walker et al. | |
| 2006/0253702 A1 | 11/2006 | Lowell et al. | |
| 2006/0258429 A1 | 11/2006 | Manning et al. | |
| 2007/0026939 A1 | 2/2007 | Asher et al. | |
| 2007/0054739 A1 | 3/2007 | Amaitis et al. | |
| 2007/0060306 A1 | 3/2007 | Amaitis et al. | |
| 2007/0060355 A1 | 3/2007 | Amaitis et al. | |
| 2007/0060358 A1* | 3/2007 | Amaitis et al. | 463/42 |
| 2007/0093296 A1 | 4/2007 | Asher et al. | |
| 2007/0099698 A1* | 5/2007 | Cole | 463/29 |
| 2007/0136817 A1* | 6/2007 | Nguyen | 726/26 |
| 2007/0130085 A1 | 7/2007 | Zhu | |
| 2007/0202941 A1 | 8/2007 | Miltenberger et al. | |
| 2007/0241187 A1* | 10/2007 | Alderucci et al. | 235/382 |
| 2008/0009345 A1* | 1/2008 | Bailey et al. | 463/29 |
| 2008/0026844 A1* | 1/2008 | Wells | 463/39 |
| 2008/0076528 A1 | 3/2008 | Nguyen et al. | |
| 2008/0076572 A1 | 3/2008 | Nguyen | |
| 2008/0091618 A1 | 4/2008 | Obrea et al. | |
| 2008/0096659 A1* | 4/2008 | Kreloff et al. | 463/39 |
| 2008/0098225 A1 | 4/2008 | Baysinger | |
| 2008/0108322 A1 | 5/2008 | Upp | |
| 2008/0113788 A1* | 5/2008 | Alderucci | 463/29 |
| 2008/0113803 A1* | 5/2008 | Alderucci | 463/42 |
| 2008/0113804 A1* | 5/2008 | Alderucci | 463/42 |
| 2008/0113806 A1* | 5/2008 | Alderucci | 463/42 |
| 2008/0113807 A1* | 5/2008 | Alderucci | 463/42 |
| 2008/0113808 A1* | 5/2008 | Alderucci | 463/42 |
| 2008/0119276 A1* | 5/2008 | Alderucci | 463/42 |
| 2008/0171592 A1 | 7/2008 | Doan | |
| 2008/0293494 A1 | 11/2008 | Adiraju et al. | |
| 2009/0088232 A1 | 4/2009 | Amaitis et al. | |
| 2009/0117997 A1 | 5/2009 | Oram | |
| 2010/0273553 A1 | 10/2010 | Zalewski | |
| 2010/0306402 A1 | 12/2010 | Russell | |
| 2011/0172008 A1* | 7/2011 | Alderucci | 463/29 |
| 2011/0201418 A1* | 8/2011 | Alderucci | 463/29 |
| 2011/0201419 A1* | 8/2011 | Alderucci | 463/29 |
| 2011/0201420 A1* | 8/2011 | Alderucci | 463/29 |

(56) References Cited

U.S. PATENT DOCUMENTS

| | | | |
|---|---|---|---|
| 2011/0294573 A1* | 12/2011 | Alderucci | 463/29 |
| 2015/0283465 A1 | 10/2015 | Alderucci | |
| 2017/0142088 A1 | 5/2017 | Alderucci | |

FOREIGN PATENT DOCUMENTS

| | | |
|---|---|---|
| JP | 2001-282742 | 10/2001 |
| JP | 2001-283121 | 10/2001 |
| JP | 2002-175488 | 6/2002 |
| JP | 2002-229951 | 8/2002 |
| JP | 2003-265865 | 9/2003 |
| JP | 2004-024666 | 1/2004 |
| JP | 2004-30617 | 1/2004 |
| JP | 2004-164640 | 6/2004 |
| JP | 2005-216250 | 8/2005 |
| WO | WO02/19593 A2 | 3/2002 |
| WO | WO 2005/022474 | 3/2005 |
| WO | WO2006/108831 | 10/2006 |
| WO | WO 2006/138064 A1 | 12/2006 |
| WO | WO 2007/087558 A2 | 8/2007 |
| WO | WO2007/100942 A2 | 9/2007 |
| WO | WO 2008/057715 A1 | 5/2008 |
| WO | WO 2008/088655 A2 | 7/2008 |

OTHER PUBLICATIONS

T. Raghu, R. Ramesh and A. B. Whinston, "Next steps for mobile entertainment portals," in Computer, vol. 35, No. 5, pp. 63-70, May 2002.*

U.S. Appl. No. 11/560,065, filed Nov. 15, 2006, Alderucci.
U.S. Appl. No. 11/560,077, filed Nov. 15, 2006, Alderucci.
U.S. Appl. No. 11/560,083, filed Nov. 15, 2006, Alderucci.
U.S. Appl. No. 11/560,124, filed Nov. 15, 2006, Alderucci.
U.S. Appl. No. 11/560,136, filed Nov. 15, 2006, Alderucci.
U.S. Appl. No. 11/560,358, filed Nov. 15, 2006, Alderucci.
U.S. Appl. No. 11/560,829, filed Nov. 15, 2006, Alderucci.
Notification of Transmittal of the International Search Report and the Written Opinion of the International Searching Authority for International Application No. PCT/US07/84805; 20 pages; dated Jun. 26, 2008.
"Understanding Login Authentication", Mar. 9, 2005, Sun Microsystems, available at <http://web.archive.org/web/20050309015728/http://java.sun.com/j2ee/1.4/docs/tutorial/docs/Security5.html>.
USPTO Office Action for U.S. Appl. No. 11/560,358, dated Jan. 23, 2009, 13 pages.
USPTO Office Action for U.S. Appl. No. 11/560,829, dated Jan. 9, 2009, 8 pages.
Pending U.S. Appl. No. 11/560,065 entitled Verifying a Gaming Device is in Communications with a Gaming Server by Passing an Indicator Between the Gaming Device and a Verification Device, by Dean Alderucci; 76 pages; filed Nov. 15, 2006.
Pending U.S. Appl. No. 11/560,077 entitled Storing Information from a Verification Device and Accessing the Information from a Gaming Device to verify that the Gaming Device is Communication with a server by Dean Alderucci; 76 pages; filed Nov. 15, 2006.
Pending U.S. Appl. No. 11/560,083 entitled Verifying a first device is in communications with a Server by Storing a value from the first device and Accessing the value from a Second Device by Dean Alderucci; 76 pages; filed Nov. 15, 2006.
Pending U.S. Appl. No. 11/560,136 entitled Accessing Information associated with a Gaming Device to Verify the Gaming Device is in communications with a Server by Dean Alderucci; 77 pages; filed Nov. 15, 2006.
Pending U.S. Appl. No. 11/560,124 entitled Accessing Known Information via a Device to determine if the Device is communicating with a Serve by Dean Alderucci; 76 pages; filed Nov. 15, 2006.
Pending U.S. Appl. No. 11/560,358 entitled Verifying whether a Gaming Device is communicating with a Gaming Server by Dean Alderucci; 77 pages; filed Nov. 15, 2006.
Pending U.S. Appl. No. 11/560,829 entitled Using a First Device to verify whether a Second device is Communicating with a Server by Dean Alderucci; 80 pages; filed Nov. 16, 2006.
Internet Abstract: Ping Yu et al., "An Online/Offline Signature Scheme Based on the Strong RSA Assumption", Proceedings of the 21st International Conference on Advanced Information Networking and Applications Workshops, May 21-23, 2007, vol. 1, ISBN: 978-0-7695-2847-2.
Trabelsi, Slim et al., "Enabling Secure Discovery in a Pervasive Environment", Institut Eurecom and SAP Labs France, undated (15 pp.).
Parno, Bryan et al., "Phoolproof Phishing Prevention", CyLab, Carnegie Mellon University, Dec. 3, 2005 (16 pp.).
Latze, C. et al., "Stronger Authentication in E-Commerce: How to Protect Even Naïve User Against Phishing, Pharming, and MITM Attacks", Proceedings of the IASTED International Communication Systems, Networks, and Applications, Oct. 8-10, 2007, Beijing, China, ISBN: CD: 978-0-88986-702-4, pp. 111-116.
Mannan, Mohammad, et al., "Using a Personal Device to Strengthen Password Authentication from an Untrusted Computer", School of Computer Science, Carleton University, Ottawa, Canada, Mar. 30, 2007.
USPTO Examiner Interview Summary Record for U.S. Appl. No. 11/560,829, dated Jul. 6, 2009 (4 pp.).
USPTO Examiner Interview Summary Record for U.S. Appl. No. 11/560,358, dated Oct. 27, 2009 (3 pp.).
USPTO Office Action for U.S. Appl. No. 11/560,358, dated Nov. 9, 2009 (49 pp.).
USPTO Restriction Requirement for U.S. Appl. No. 11/560,829, dated Nov. 2, 2009 (6 pp.).
U.S. PTO Office Action for U.S. Appl. No. 11/560,829; 18 pages; dated Apr. 15, 2010.
Notice of Panel Decision from Pre Appeal Brief Review for U.S. Appl. No. 11/560,358; 2 pages; dated Jun. 8, 2010.
U.S. PTO Office Action for U.S. Appl. No. 11/560,124; 14 pages; dated Apr. 28, 2010.
U.S. PTO Office Action for U.S. Appl. No. 11/560,136; 13 pages; dated Apr. 29, 2010.
U.S. PTO Office Action for U.S. Appl. No. 11/560,083; 14 pages; dated May 5, 2010.
U.S. PTO Office Action for U.S. Appl. No. 11/560,077; 15 pages; dated Apr. 23, 2010.
U.S. PTO Office Action for U.S. Appl. No. 11/560,065; 12 pages; dated Apr. 29, 2010.
AU Examination Report for AU Application No. 2007319182; dated Jul. 23, 2010; 2 pages.
USPTO Interview Summary for U.S. Appl. No. 11/560,077; dated Oct. 26, 2010; 3 pages.
USPTO Interview Summary for U.S. Appl. No. 11/590,829; dated Sep. 27, 2010; 4 pages.
EP Supplementary Search Report for Application No. 07864449/9 dated Dec. 18, 2010; 7 pages.
Notice of Allowance for U.S. Appl. No. 11/560,065; 10 pages; dated Jan. 21, 2011.
Translation of Stockmar, WO2006108831 A1, dated Oct. 19, 2006; 17 pages.
Notice of Allowance for U.S. Appl. No. 11/560,077; 14 pages; dated Jan. 28, 2011.
Notice of Allowance for U.S. Appl. No. 11/560,083; 14 pages; dated Jan. 27, 2011.
Notice of Allowance for U.S. Appl. No. 11/560,136; 11 pages; dated Feb. 7, 2011.
Notice of Allowance for U.S. Appl. No. 11/560,124; 13 pages; dated Jan. 28, 2011.
Notice of Allowance for U.S. Appl. No. 11/560,358; 10 pages; dated May 3, 2011.
CA Office Action for Application No. 2669826; dated Nov. 21, 2011; 4 pages.
U.S. Office Action for U.S. Appl. No. 13/092,440; dated Oct. 12, 2012.

(56) References Cited

OTHER PUBLICATIONS

U.S. Office Action for U.S. Appl. No. 13/095,458, dated Oct. 16, 2012.
Japan Office Action for Application No. 2009-537361, dated Mar. 6, 2013.
U.S. Office Action for U.S. Appl. No. 13/096,113, dated Oct. 18, 2012.
Australian Examination Report for Application No. 2007319182, dated Apr. 23, 2012.
AU Examination Report for App. No. 2012202243; dated Sep. 25, 2013; 2 pages.
CA Office Action for Application No. 2669826; dated Jul. 17, 2013; 3 pages.
JP Decision of Refusal for App. No. 2009-537361; dated Apr. 1, 2014; 6 pages (w/English translation).
U.S. Office Action for U.S. Appl. No. 13/052,727; dated Dec. 6, 2013; 21 pages.
U.S. Office Action for U.S. Appl. No. 11/560,829, dated Jun. 13, 2014; 13 pages.
U.S. Final Office Action for U.S. Appl. No. 13/092,440; dated Jun. 17, 2013; 14 pages.
U.S. Final Office Action for U.S. Appl. No. 13/095,458, dated Jun. 18, 2013; 16 pages.
Shintaro Mizuno et al., Authentication Using Multiple Communication Channels, Nov. 11, 2005.
EP Communication Pursuant to Art. 94(3) EPC for App. No. 07864449.9; dated Sep. 4, 2015; 9 pages.
CA Office Action for Application No. 2669826; dated Aug. 12, 2016; 4 pages.
AU Examination Report for App. No. 2015203531; dated Sep. 8, 2016; 2 pages.
Japan Office Action for Application No. 2014-155429, dated Nov. 17, 2015, 10 pages.
Japan Office Action for Application No. 2014-155429, dated Nov. 22, 2016, 4 pages w/English Translations.
AU Second Examination Report for App. No. 2015203531; dated Mar. 17, 2017; 3 pages.
AU Third Examination Report for App. No. 2015203531; dated Jun. 21, 2017; 3 pages.
AU Fourth Examination Report for App. No. 2015203531; dated Aug. 24, 2017; 3 pages.
Japan Office Action for Application No. 2014-155429, dated Jul. 4, 2017, 4 pages w/English Translations.

* cited by examiner

ACCESSING INFORMATION ASSOCIATED WITH A MOBILE GAMING DEVICE TO VERIFY THE MOBILE GAMING DEVICE IS IN COMMUNICATIONS WITH AN INTENDED SERVER

CROSS-REFERENCE

The present application is a continuation application of and claims priority to the U.S. patent application Ser. No. 11/560,136, filed on Nov. 15, 2006 now U.S. Pat. No. 7,942,742, which is incorporated by reference herein in its entirety.

RELATED APPLICATIONS

The present application is related to the following U.S. patent applications, each of which is incorporated herein by reference in their entirety for the purpose of enablement and written description: Ser. No. 10/836,999, filed on Apr. 29, 2004; Ser. No. 10/836,975, filed on Apr. 29, 2004; Ser. No. 10/836,958, filed on Apr. 29, 2004; Ser. No. 10/836,077, filed on Apr. 29, 2004; Ser. No. 10/835,995, filed on Apr. 29, 2004; Ser. No. 10/822,484, filed on Apr. 12, 2004; Ser. No. 10/816,238, filed on Apr. 1, 2004; Ser. No. 10/798,106, filed on Mar. 10, 2004; Ser. No. 10/784,353, filed on Feb. 23, 2004; Ser. No. 10/771,221, filed on Feb. 3, 2004; Ser. No. 10/771,076, filed on Feb. 3, 2004; Ser. No. 10/759,693, filed on Jan. 15, 2004; Ser. No. 10/687,302, filed on Oct. 14, 2003; Ser. No. 10/667,923, filed on Sep. 22, 2003; Ser. No. 10/667,755, filed on Sep. 22, 2003; Ser. No. 11/190,613, filed on Jul. 26, 2005; Ser. No. 11/172,018, filed on Jun. 29, 2005; Ser. No. 11/171,809, filed on Jun. 29, 2005; Ser. No. 11/076,561, filed on Mar. 9, 2005; Ser. No. 11/063,311, filed on Feb. 21, 2005; Ser. No. 11/032,724, filed on Jan. 10, 2005; Ser. No. 11/022,394, filed on Dec. 22, 2004; Ser. No. 11/021,848, filed on Dec. 22, 2004; Ser. No. 11/018,978, filed on Dec. 21, 2004; Ser. No. 10/983,279, filed on Nov. 5, 2004; Ser. No. 10/963,399, filed on Oct. 12, 2004; Ser. No. 10/879,972, filed on Jun. 28, 2004; Ser. No. 10/194,018, filed on Jul. 12, 2002; Ser. No. 10/193,980, filed on Jul. 12, 2002; Ser. No. 10/193,978, filed on Jul. 12, 2002; Ser. No. 10/193,977, filed on Jul. 12, 2002; Ser. No. 10/193,971, filed on Jul. 12, 2002; Ser. No. 10/193,817, filed on Jul. 12, 2002; Ser. No. 09/846,025, filed on Apr. 30, 2001; Ser. No. 09/378,327, filed on Aug. 20, 1999; Ser. No. 09/267,655, filed on Mar. 12, 1999; Ser. No. 11/406,783, filed Apr. 18, 2006; Ser. No. 11/403,722, filed on Apr. 12, 2006; Ser. No. 11/397,596, filed on Apr. 3, 2006; Ser. No. 11/335,253, filed on Jan. 18, 2006; Ser. No. 11/335,210, filed on Jan. 18, 2006; Ser. No. 11/334,848, filed on Jan. 18, 2006; Ser. No. 11/256,568, filed on Oct. 21, 2005; Ser. No. 11/210,482, filed on Aug. 24, 2005; Ser. No. 11/201,830, filed on Aug. 10, 2005; Ser. No. 11/201,812, filed on Aug. 10, 2005; Ser. No. 11/199,964, filed on Aug. 9, 2005; Ser. No. 11/199,835, filed on Aug. 9, 2005; Ser. No. 11/199,831, filed on Aug. 9, 2005; Ser. No. 10/654,280, filed on Sep. 3, 2003; Ser. No. 10/651,537, filed on Aug. 29, 2003; Ser. No. 10/616,779, filed on Jul. 10, 2003; Ser. No. 10/453,769, filed on Jun. 3, 2003; Ser. No. 10/453,761, filed on Jun. 3, 2003; Ser. No. 10/410,197, filed on Apr. 10, 2003; Ser. No. 10/404,043, filed on Apr. 2, 2003; Ser. No. 10/287,332, filed on Nov. 1, 2002; Ser. No. 10/194,358, filed on Jul. 12, 2002; Ser. No. 10/194,186, filed on Jul. 12, 2002; and Ser. No. 10/194,019, filed on Jul. 12, 2002.

GUIDELINES FOR INTERPRETING THE PRESENT APPLICATION

Terms

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

The term "herein" means "in the present application, including anything which may be incorporated by reference", unless expressly specified otherwise.

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The phrase "at least one of" when such phrase modifies a plurality of things (such as an enumerated list of things), means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of" when such phrase modifies a plurality of things, does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The phrase "based on" does not mean "based only on", unless expressly specified otherwise. In other words, the phrase "based on" describes both "based only on" and "based at least on". The phrase "based at least on" is equivalent to the phrase "based at least in part on".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Indication

The term "indication" is used in an extremely broad sense. The term "indication" may, among other things, encompass a sign, symptom, or token of something else.

The term "indication" may be used to refer to any indicia and/or other information indicative of or associated with a subject, item, entity, and/or other object and/or idea.

As used herein, the phrases "information indicative of" and "indicia" may be used to refer to any information that represents, describes, and/or is otherwise associated with a related entity, subject, or object.

Indicia of information may include, for example, a code, a reference, a link, a signal, an identifier, and/or any combination thereof and/or any other informative representation associated with the information.

In some embodiments, indicia of information (or indicative of the information) may be or include the information itself and/or any portion or component of the information. In some embodiments, an indication may include a request, a solicitation, a broadcast, and/or any other form of information gathering and/or dissemination.

Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device or article is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

Disclosed Examples and Terminology are not Limiting

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. §1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

All words in every claim have the broadest scope of meaning they would have been given by a person of ordinary skill in the art as of the priority date. No term used in any claim is specially defined or limited by this application except where expressly so stated either in this specification or in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g., weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described in a particular sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions.

A "processor" means one or more microprocessors, central processing units (CPUs), computing devices, microcontrollers, digital signal processors, or like devices or any combination thereof.

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

35 U.S.C. §112, Paragraph 6

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Disclaimer

Numerous references to a particular embodiment does not indicate a disclaimer or disavowal of additional, different embodiments, and similarly references to the description of embodiments which all include a particular feature does not indicate a disclaimer or disavowal of embodiments which do not include that particular feature. A clear disclaimer or disavowal in the present application shall be prefaced by the phrase "does not include" or by the phrase "cannot perform".

Incorporation by Reference

Any patent, patent application or other document referred to herein is incorporated by reference into this patent application as part of the present disclosure, but only for purposes of written description in accordance with 35 U.S.C. §112, paragraph 1 and enablement in accordance with 35 U.S.C. §112, paragraph 1, and should in no way be used to limit, define, or otherwise construe any term of the present application where the present application, without such incorporation by reference, would not have failed to provide an ascertainable meaning, but rather would have allowed an ascertainable meaning for such term to be provided. Thus, the person of ordinary skill in the art need not have been in any way limited by any embodiments provided in the reference.

Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application.

Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant intends to file additional applications to pursue patents for subject matter that has been disclosed and enabled but not claimed in the present application.

DETAILED DESCRIPTION OF THE INVENTION

Figure 1:
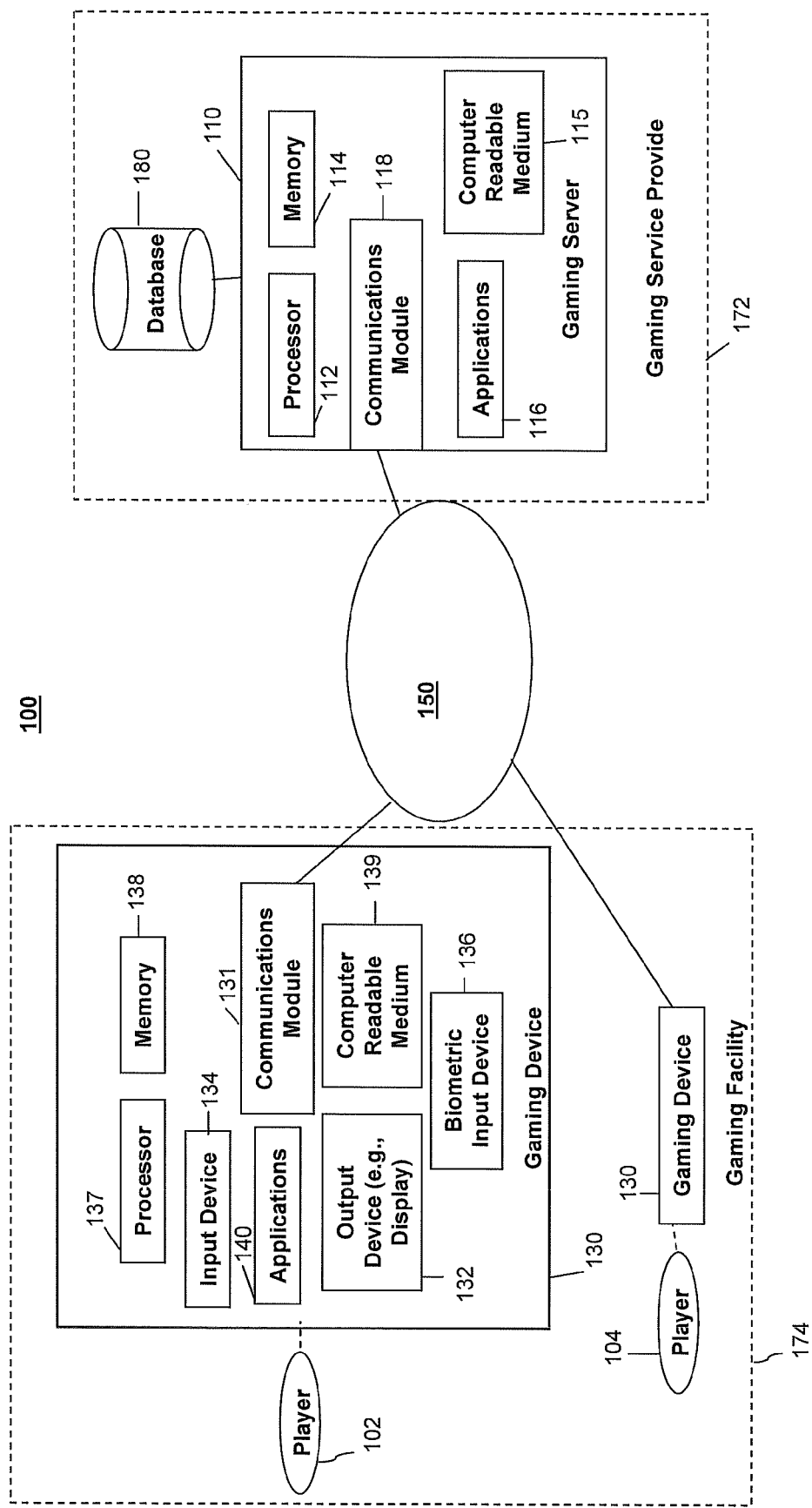
FIG. 1 shows a gaming system according to an embodiment of the invention.

Referring to FIG. 1, there is shown a distributed gaming system 100 for providing one or more gaming activities, and possibly other convenience services, to one or more players, such as players 102 and 104, according to an embodiment of the invention. In particular, gaming system 100 may include a gaming server 110 that provides the gaming activities and convenience services, one or more gaming devices 130 that provide players 102/104 access to gaming system 100 and that operate with gaming server 110 to provide the gaming activities and convenience services to the players, possibly one or more databases 180, and a communications network 150 through which gaming server 110 and gaming devices 130 communicate. As such, according to an embodiment of the invention, through the use of gaming devices 130 gaming system 100 enables players 102 and 104 to engage in gaming activities and possibly other convenience services as provided by gaming server 110.

More specifically, according to an embodiment of the invention, gaming server 110 may be any computing device operable to provide one or more gaming activities and to exchange information related to gaming activities ("gaming information") over communications network 150 with gaming devices 130. Gaming information may include any information that is necessary and/or desirable in the operation of a gaming activity in which a player participates or engages. According to an embodiment of the invention, gaming activities provided by gaming server 110 may include gambling activities, such as those provided by casinos. Example gambling activities may include any casino-type gambling activities such as slot machines, video poker, table games (e.g., craps, roulette, blackjack, pai gow poker, Caribbean stud poker, baccarat, etc.), the wheel of fortune game, keno, sports betting, horse racing, dog racing, jai alai, and any other gambling activities. The gaming activities provided by gaming server 110 may also include wagering on any type of event. Events may include, for example, sporting events, such as horse racing and auto racing, and athletic competitions, such as football, basketball, baseball, golf, etc. Events may also include events that do not normally involve wagering such as political elections, entertainment industry awards, and box office performance of movies. The gaming activities provided by gaming server 110 may further include lotteries or lottery-type activities, such as state and interstate lotteries. These lotteries may include all forms of number-selection lotteries, "scratch-off" lotteries, and other lottery contests. The gaming activities provided by gaming server 110 may also include non-wagering/non-gambling activities, including games and events. One skilled in the art will recognize that gaming server 110 is not limited to the above described gaming activities and other gaming activities are possible.

According to an embodiment of the invention, gaming server 110 may also be operable to provide one or more convenience services and to exchange information related to these convenience services ("convenience services information") over communications network 150 with gaming devices 130. Convenience services information may include any information that is necessary and/or desirable in the operation of a convenience service in which a player engages. Example convenience services may include restaurant services, entertainment services, hotel services, money management services, news services, financial exchange services, or other appropriate services and combinations thereof that may be offered to a player of a gaming device. Restaurant services may include, for example, services that allow a player to order drinks, order food, make reservations, or perform other restaurant related activities. Entertainment services may include, for example, services that allow a player to purchase show tickets, arrange appointments or services, virtually shop, arrange transportation, or perform other entertainment related activities. Hotel services may include, for example, services that allow a player to check in, check out, make spa appointments, check messages, leave messages, review a hotel bill, or perform other guest-related activities. Money management services may include, for example, services that allow a player to transfer funds, pay bills, or perform other money management activities. News services may include, for example, services that allow a player to select and view a news source and/or a news story. A financial exchange service may include, for example, a service that allows a player to place a buy and/or sell order on a financial exchange. One skilled in the art will recognize that gaming server 110 is not limited to the above described convenience services.

Referring again to FIG. 1, according to an embodiment of the invention, gaming server 110 may include one or more processors, such as processor 112, memory 114, and one or more applications 116, which are operable to provide gaming activities and convenience services like those described herein and to exchange gaming and convenience services information with the gaming devices 130. Applications 116 may be embodied as one or more software modules that reside in memory 114 and execute on processor 112. Alternatively or in addition, applications 116 may be embodied as one or more firmware and/or hardware modules. Gaming server 110 may also include one or more communications modules 118 for interfacing with and communicating over communications network 150 (and possibly other communications networks not shown) and for transmitting and/or receiving gaming and convenience services information with gaming devices 130. Gaming server 110 may also include a computer readable medium 115 (e.g., disk drive) for storing applications 116. As shown in FIG. 1, gaming server 110 may also be operable to access one or more databases, such as database 180. Database 180 may store, for example, player record or player profile information for each player of gaming system 100, as further described herein. While gaming server 110 is shown as a single server, one skilled in the art will recognize that gaming server 110 may include a plurality of servers, including redundant servers. According to an embodiment of the invention, gaming server 110 may, at least in part, be a web server, such as an http (hypertext transfer protocol) web server.

According to an embodiment of the invention, gaming server 110 and the associated applications 116 may be provided by a gaming service provider 172. The actual controlling of gaming activity and convenience services in turn may be provided by a gaming facility 174. (A gaming facility may include, for example, a casino, casino-hotel, or other type of entity in Las Vegas, Nev., Atlantic City, N.J., or some other state, may include an entity within international jurisdiction, such as a cruise ship, may include a Native American gaming facility, and/or may include a "racino", which is a race track that provides slot machines, video lottery terminals, etc. One skilled in the art will recognize that a gaming facility may include other types of entities.) Alternatively, gaming facility 174 may not only control the gaming activity and convenience services, but may also provide gaming server 110 and the associated applications 116, in which case a gaming service provider 172 is not present. As another alternative, gaming service provider 172 may provide gaming server 110 and the associated applications 116 and may also control the gaming activity and convenience services, in which case a gaming facility 174 is not present. One skilled in the art will recognize that other combinations of these arrangements are possible. Assuming a gaming service provider 172 and gaming facility 174 are present, as shown in FIG. 1 gaming server 110 may reside within the geographic boundaries of gaming service provider 172 and the gaming service provider in turn may be remotely located from gaming facility 174. Nonetheless, one skilled in the art will recognize that other arrangements are possible. For example, gaming server 110 may be remotely located from gaming service provider 172. As another example, gaming service provider 172 and gaming server 110 may be within the geographic boundaries of gaming facility 174.

Referring now to gaming devices 130, these devices provide players 102/104 with access to gaming system 100 and enable players to engage in one or more gaming activities and possibly other convenience services as provided by gaming server 110. Accordingly, a gaming device 130 may be any device that, in combination with gaming server 110, is operable to provide one or more gaming activities and possibly convenience services to a player using the device, to receive inputs from the player and to present information to the player in relation to the gaming activities and convenience services, and to exchange gaming and convenience services information over communications network 150 with gaming server 110. According to an embodiment of the invention, a gaming device 130 may be a mobile/cellular phone, a PDA (personal digital assistant), a pocket PC (personal computer), a personal computing device (e.g., a laptop), a pager, or any special or general purpose computing device (e.g., a kiosk) configured to provide one or more gaming activities and possibly convenience services, such as a slot machine, a video poker machine, etc. According to an embodiment of the invention, gaming system 100 may include different types of gaming devices 130. One skilled in the art will recognize that other types of gaming devices are possible.

According to an embodiment of the invention, a gaming device 130 may be a stationary device or a device tethered to a stationary object and may be located within a gaming area of a gaming facility 174 or may be located in a remote location, such as in a player's room, by a pool-side, in a restaurant, etc. Alternatively, a gaming device may be a mobile device, thereby allowing a player to be mobile while participating in one or more gaming activities or convenience services. For example, a mobile gaming device may allow a player to engage in an activity and/or service while within or remote from a gaming area of a gaming facility. When a gaming device is a mobile device, the device may be provided to a player by a gaming facility 174 and/or a gaming service provider 172. For example, a player may obtain such a device upon check-in at a hotel and/or from a central location from within a gaming facility, which device is then temporarily assigned to the player. Alternatively, a mobile gaming device may be a device owned by the player, such as a cellular phone or PDA.

Referring again to FIG. 1, according to an embodiment of the invention, a gaming device 130 may include a communications module 131 for interfacing with communications network 150 and for transmitting and/or receiving gaming and convenience services information with gaming server 110. A gaming device may also include at least one output device. Example output devices may include at least one display 132, such as a CRT (cathode ray tube) or an LCD (liquid crystal display) monitor, for displaying textual and/or graphical information and player selectable options associated with one or more gaming activities or convenience services. Other example output devices may include one or more LEDs (light-emitting diodes), and at least one audio output (e.g., a speaker) for conveying information associated with one or more gaming activities or convenience services. A gaming device may also include at least one input device 134, such as a mouse, a touch-sensitive pad, a pointer, a stylus, a trackball, a hard button, a keypad and/or keyboard with one or more keys representing alphanumeric characters, a wheel, a touch-sensitive monitor, and/or an audio input (e.g., a microphone), thereby allowing a player to enter commands and/or information related to one or more gaming activities or convenience services. A gaming device may also include at least one biometric input device 136 for entering biometric information, such as a fingerprint, to gain access to gaming system 100.

According to an embodiment of the invention, a gaming device may also include one or more processors, such as processor 137, memory 138, and one or more applications 140 that operate in conjunction with applications 116 to provide one or more gaming activities and convenience services. Applications 140 may be embodied as one or more software modules that reside in memory 138 and execute on processor 137. Alternatively or in addition, applications 140 may be embodied as one or more firmware and/or hardware modules. When applications 140 are embodied as one or more software modules, these software modules may preloaded on the gaming device, stored on a computer readable medium 139, for example, and thereafter used repeatedly. Alternatively or in addition, each time a player selects a gaming activity or convenience service, a corresponding application 140 may be loaded from gaming server 110, for example (e.g., as web applications). One skilled in the art will recognize that other configurations are possible. A gaming device may also be operable to access one or more databases, such as database 180, either directly or via gaming server 110, for example. One skilled in the art will also recognize that different gaming devices may provide different gaming activities and convenience services depending, for example, on the gaming device and/or player. According to an embodiment of the invention, a gaming device 130 may, at least in part, operate as a web client (e.g., include a Web browser).

As indicated, gaming activities and convenience services may be provided to a player through a combination of applications 116 executing on gaming server 110 and applications 140 executing on a gaming device. One skilled in the art will recognize that any portion of a gaming activity or convenience service may execute on the gaming server 110 and gaming device 130. For example, according to an embodiment of the invention, a gaming activity or convenience service may execute on the gaming server with the gaming device merely presenting information to and receiving inputs from a player. According to another embodiment of the invention, a gaming activity or convenience service may execute on the gaming device, which in turn presents results to the gaming server. One skilled in the art will recognize that other variations are possible.

According to an embodiment of the invention, in addition to providing a player with one or more gaming activities and convenience services, a gaming device 130 may also be operable to provide a player with one or more communication services, such as telephony and/or data communication services, such as cellular, POTS (plan old telephone service), and/or IP (Internet protocol) telephony services, Internet based services, email services, text messaging services, etc., as is known in the art. As such, in the case of a gaming device owned by a player for example, the gaming device may provide a telephony and/or data communication service, and also provide one or more gaming activities and convenience services as provided by gaming system 100. A player may purchase these various telephony/data communication services and gaming activity/convenience services either together or separately. One skilled in the art will also recognize that even when a gaming device 130 is not owned by a player, the device may still provide telephony and/or data communication services.

One skilled in the art will recognize that common hardware and/or software modules of a gaming device 130 may be used to provide telephony and/or data communication services, and one or more gaming activities and/or convenience services. For example, hardware and/or software modules used to provide data communication services may also be used to communicate with a gaming server 110. According to another embodiment of the invention, a telephony and/or data communication service may or may not use communications network 150. In other words, according to an embodiment of the invention, a gaming device may include one or more communications modules, in addition to communication module 131.

Referring now to communications network 150, according to an embodiment of the invention, this network provides a mechanism for gaming devices 130 and gaming server 110 to exchange gaming and convenience services information. As an example, gaming and convenience services information may include the loading of applications 140 to the gaming devices 130, security information, such as logins and passwords, and any graphical, textual, and/or audible representations of information and selections exchanged between the gaming server 110 and gaming devices 130. One skilled in the art will recognize that other information is possible. Accordingly, communications network 150 may be any network that allows, in whole or in part, for the transmission of graphical, textual, and/or audible information, and for the transmission of information in any format including digital and/or analog format.

In particular, according to an embodiment of the invention, communications network 150 may be a wireline and/or wireless network, including a telephony and/or data communications network. Communications network 150 may be a private and/or public network, and depending on the security needs of the gaming and convenience services information being exchanged between gaming server 110 and gaming devices 130, may include, at least in part, the public Internet. Network 150 may be based on any known and/or future transport technologies. Example wireless technologies may include, for example, licensed or license-exempt technologies and in particular, may include Code Division Multiple Access (CDMA), Global System for Mobile Communication (GSM), General Packet Radio Service (GPRS), WiFi (802.11x), WiMax (802.16x), and/or satellite-based technologies. Example wireline technologies may include the Public Switched Telephone Network (PSTN), Digital Subscriber Line (DSL), Integrated Services Digital Network (ISDN), cable modem technologies, and/or LAN (local area network) based technologies. One skilled in the art will recognize that other transport technologies and combinations of transport technologies may be used.

According to an embodiment of the invention, communications network 150 may include a plurality of different networks, which may or may not be interconnected and which may or may not be based on different transport technologies. Gaming server 110 may interface each network individually and/or may interface one or more networks through a common access point. Different gaming devices may interface different networks. These multiple networks may each provide or cover different gaming areas/locations. Alternatively, one or more networks may cover the same gaming area/location and be based on different transport technologies, thereby allowing different types of gaming devices to use different technologies to access gaming server 110. Because communications network 150 may include multiple networks, one or more gaming devices may use a wireless network to access gaming server 110 and as such, may be mobile gaming devices. Similarly, one or more other gaming devices may use a wireline network to access gaming server 110 and as such, may be stationary gaming devices.

Figure 2:
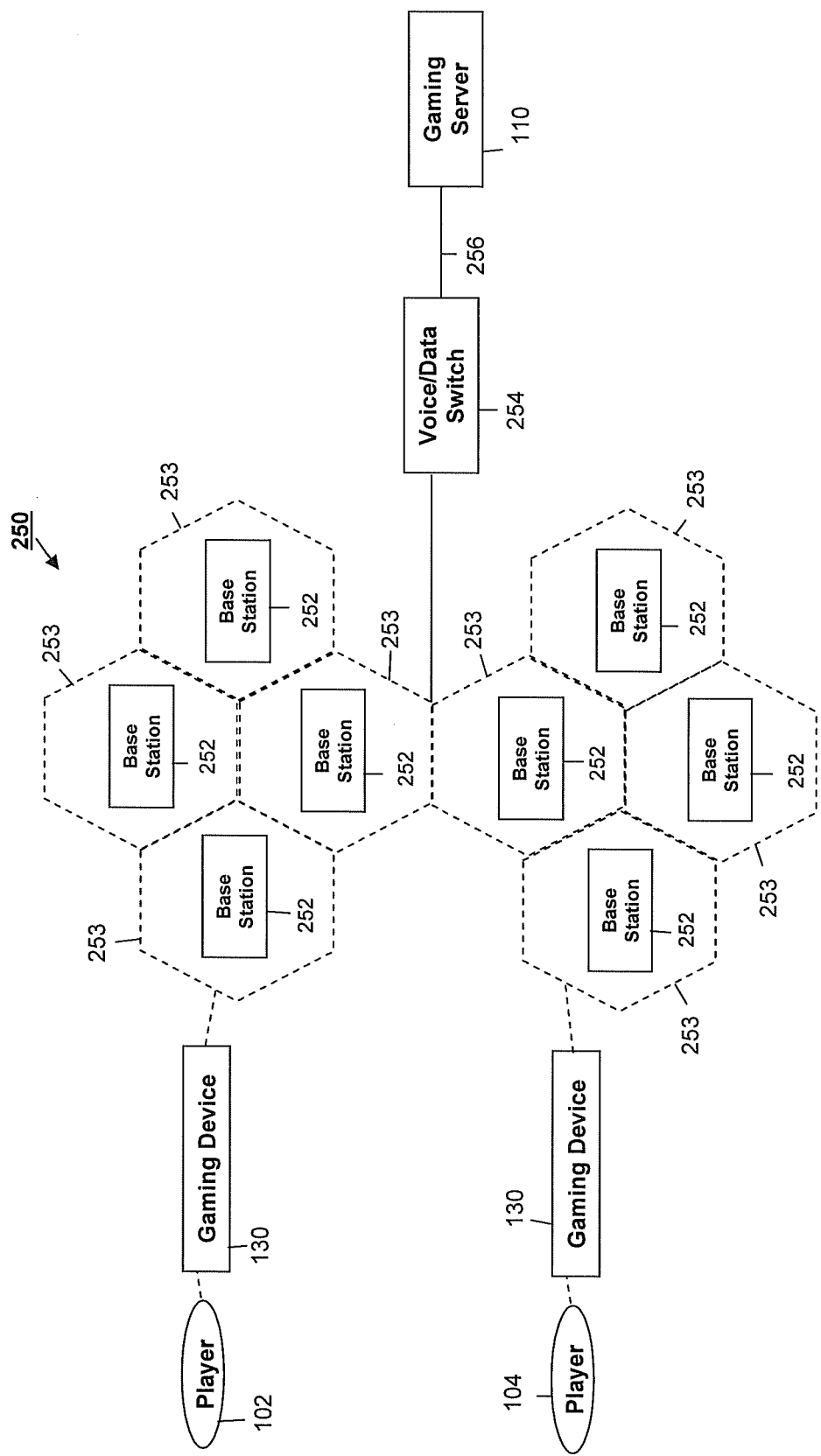
FIG. 2 shows an example communications network according to an embodiment of the invention that may be used in the gaming system of FIG. 1

Referring to FIG. 2, there is shown an example communications network 250 according to an embodiment of the invention. Communications network 250 is a cellular network and includes a plurality of base stations 252, each of which has a corresponding coverage area 253. Base station technology is known in the art and base stations 252 may be of any type found in a typical cellular network. The base stations may have coverage areas that overlap. Gaming devices 130 access network 250 through the reception and transmission of radio signals with base stations 252. As an example, gaming devices 130 may be cellular phones. Network 250 also includes at least one voice/data switch 254, which may be connected to base stations 252 through a mobile switching center (MSC) (not shown). Gaming server 110 is connected to voice/data switch 254 through a dedicated, secure landline 256, for example. According to an embodiment of the invention, communications network 250 may provide telephony and/or data communication services to gaming devices 130. As an example, the data communication services may be used to transfer, via voice/data switch 254, gaming and convenience services information between the gaming devices 130 and gaming server 110. Similarly, voice/data switch 254 may route telephony calls between gaming devices 130 and a public and/or private voice network (not shown).

Referring again to FIG. 1, according to an embodiment of the invention, gaming system 100 may also include one or more databases, such as database 180, including possibly one or more redundant and/or backup databases. According to an embodiment of the invention, database 180 may be accessible to gaming server 110 and may also be accessible to one or more gaming devices 130. One or more of the databases may be provided by and/or controlled by gaming service provider 172 and/or gaming facility 174, and may be co-located with and/or remotely located from gaming server 110. One skilled in the art will also recognize that database 180 may be a part of gaming server 110.

It should be noted that the term "database" as used herein is not intended to limit how the information maintained therein is stored and/or accessed. For example, database 180 may be a database management system. Alternatively, database 180 may be a computer readable medium within gaming server 110 and information may be maintained therein by the gaming server as flat files, for example. As another example, database 180 may be one or more dynamic data structures (e.g., arrays) within memory 114 of gaming server 110 and may be maintained therein by the gaming server. Alternatively, information may be maintained using any combination of these implementations and other implementations.

According to an embodiment of the invention, database 180 may store player profile information for one or more players 102/104 of gaming system 100. One skilled in the art will recognize that database 180 may store other types of information. The player profile information may be accessible to gaming server 110 in providing gaming activities and/or convenience services and may also be accessible to one or more gaming devices 130. The player profile information may be created, maintained, and modified, and in particular, may be created, maintained, and modified when a player first enters a gaming facility 174 (e.g., registers at a hotel), when a player subscribes to one or more gaming activities and/or convenience services (assuming a player may subscribe to such activities/services), when a player obtains a gaming device (e.g., upon check-in at a hotel and/or from a central location within a gaming facility), as a player engages in one or more gaming activities, and/or as a player engages in one more convenience services. One skilled in the art will recognize that player profile information may be created, maintained, and modified at other times. The player profile information may be information the player provides and/or designates, information assigned to the player, information related to the monitoring of a player, and/or information associated with a gaming device 130 used by the player, in addition to other types of information. The player profile information may be created, maintained, and modified in database 180 by a player, by an attendant of gaming system 100, and/or by gaming server 110.

According to an embodiment of the invention, the player profile information stored in database 180 may include information relating to respective players themselves. As an example, the player profile information may include player identification information, such as a player's name, home and/or business address, hotel room number, one or more telephone numbers including a cell phone number, a social security number, a driver's license number, one or more account numbers including bank, ATM, debit-card, and/or credit-card numbers, and credit/credit-scoring information. One skilled in the art will recognize that the profile information may include other types of player identification information.

The player profile information may also include player security information that a player may need to enter at a gaming device 130, for example, in order to gain access to gaming system 100/gaming server 110. Player security information may include a player identification value such as a login, a player password, and electronic files of fingerprint, voice, photograph, retina scan, and/or other biometric information. In the case of the login and password, one or both of these values may be designated/assigned by the player, by an attendant of gaming facility and/or gaming service provider, or some combination thereof.

Player security information may also include one or more pieces of personal information associated with a player, such as a player's maiden name, a name of a player's pet, a town in which a player was born, and/or a hospital in which a player was born. One skilled in the art will recognize that the player security information may include other types of personal information associated with a player. The personal information associated with a player may be stored in database 180 in different formats, such as just the personal information itself (e.g., "Smith"), as a common question and an answer to the question, in which the answer is the personal information (e.g., "What is you maiden name? Smith"), and/or as an unfinished statement and a completion to the unfinished statement, in which the completion to the unfinished statement is the personal information (e.g., "Your maiden name is: Smith"). One skilled in the art will recognize that the personal information may be stored in other formats. The personal information, regardless of the format, may be stored as a textual value and/or as an audible value.

The player security information may also include one or more random values specified by a player. A random value may include, for example, any alphanumeric text value, a plurality of alphanumeric text values, an audible signal, an audible tone, an audible text value, and/or a plurality of audible text values, or some combination thereof. One skilled in the art will recognize that player security information may include other types of random values.

One skilled in the art will also recognize that the profile information may include other types of player security information than that disclosed herein. According to different embodiments of the invention as disclose herein, a player may specify some or all of the player security information during a registration period prior to the start of any gaming activity and/or engaging in any convenience service, and/or during a gaming activity and/or convenience service.

According to an embodiment of the invention, the player profile information may also include information relating to the gaming device 130 that a player is using to access gaming system 100. Gaming device information may including a tracking value assigned to the gaming device, such as a serial number, inventory number, or some other alphanumeric value assigned to the gaming device. As an example, the tacking number assigned to a gaming device may be assigned by gaming server 110, a manufacturer of the gaming device, a gaming facility, a gaming service provider, and/or a gaming authority 176 (A gaming authority may include, for example, the Nevada Gaming Commission, the Nevada State Gaming Control Board, the New Jersey Division of Gaming Enforcement (DGE), the New Jersey Casino Control Commission (CCC), or the National Indian Gaming Commission, One skilled in the art will recognize that a gaining authority may include some other local, state, Federal, and/or non-federal gaming/gambling/casino commission/board.), or some combination thereof. One skilled in the art will recognize that gaming server 110 may use a tracking value to internally refer to a gaming device.

Gaming device information may also include a name (e.g., an address) assigned to a gaming device including, for example, a URL (uniform resource locator), an IP address, a MAC (media access control) address, a host name (such as a fully qualified domain name and/or a subname of a fully qualified domain name), a phone number, an electronic serial number (ESN), and/or a mobile identification number (MIN). One skilled in the art will recognize that other types of names may be assigned to a gaming device. One skilled in the art will also recognize that gaming server 110 may use a name to internally refer to and/or communicate with a gaming device.

One skilled in the art will recognize that gaming device information may be created, maintained, and modified in database 180 by a player, by an attendant of gaming system 100, and/or by gaming server 110. For example, the gaming server may determine a gaming devices name through communications with a gaming device and store this information in database 180. One skilled in the art will also recognize that the player profile information may include other types of gaming device information than that disclosed herein.

According to an embodiment of the invention, the player profile information may also include information related to gaming activities. Information related to gaming activities may include, for example, gaming activity preferences of a player, such as preferred gaming activities, preferred configurations of gaming activities, preferred screen configurations of gaming activities, and betting/wagering preferences in general and/or with respect to particular gaming activities. One skilled in the art will recognize that other gaming activity preferences of a player may be maintained.

Information related to gaming activities may also include information associated with one or more gaming activities engaged in by a player. As an example, gaming server 110 may monitor a player's activity to obtain such information. Such information may be maintained, for example, for the entire duration a player engages in various gaming activities and/or may be maintained over a moving fixed duration of time. The information associated with one or more gaming activities engaged in by a player may include a name of a gaming activity currently engaged in by a player, a name of a gaming activity previously engaged in by a player, a name of any gaming activity engaged in by a player, and a sequence of one or more names of gaming activities as engaged in by a player. The information associated with one or more gaming activities engaged in by a player may also include a location at which a player is currently engaged in a gaming activity, a location at which a player previously engaged in a gaming activity, a location at which the player engaged in any gaming activity, and a sequence of one or more locations at which a player engaged in gaming activities. Location type information may be obtained, for example, based on the location of a stationary gaming device or in the case of a mobile gaming device, by using a location verification technology, such as a network-based technology like multi-lateration, triangulation, or geo-fencing, and/or a satellite-based technology like a global positioning satellite (GPS) technology, for example. One skilled in the art will recognize that other location verification technologies may be used.

The information associated with one or more gaming activities engaged in by a player may also include an obtained skill (or success) level of a gaming activity currently engaged in by a player, an obtained skill/success level of a gaming activity previously engaged in by a player, an obtained skill/success level of any gaming activity engaged in by a player, and a sequence of one or more obtained skill/success levels of gaming activities as engaged in by a player.

The information associated with one or more gaming activities engaged in by a player may also include an amount wagered in a gaming activity currently engaged in by a player, an amount wagered in a gaming activity previously engaged in by a player, an amount wagered in any gaming activity engaged in by a player, a sequence of wagered amounts in one or more gaming activities as engaged in by a player, and an average amount wagered by a player in connection with one or more gaming activities.

The information associated with one or more gaming activities engaged in by a player may also include a monetary outcome (i.e., amount won or amount lost) in a gaming activity currently engaged in by a player, a monetary outcome in a gaming activity previously engaged in by a player, a monetary outcome in any gaming activity engaged in by a player, a sequence of a monetary outcomes in one or more gaming activities as engaged in by a player, and a total monetary outcome in one or more gaming activities engaged in by a player.

The information associated with one or more gaming activities engaged in by a player may also include a win-lose outcome in a gaming activity currently engaged in by a player, a win-lose outcome in a gaming activity previously engaged in by a player, a win-lose outcome in any gaming activity engaged in by a player, and a sequence of a win-lose outcomes in one or more gaming activities as engaged in by a player.

The information associated with one or more gaming activities engaged in by a player may also include a sequence of events (e.g., cards dealt in a hand of blackjack) in a gaming activity currently engaged in by a player, a sequence of events in a gaming activity previously engaged in by a player, a sequence of events in any gaming activity engaged in by a player, and a sequence of events in one or more gaming activities as engaged in by a player. One skilled in the art will recognize that other information associated with one or more gaming activities engaged in by a player may be maintained.

According to an embodiment of the invention, the player profile information may also include credit information of a player. The credit information may include a credit amount of a player as reflected by a credit account. According to an embodiment of the invention, the credit amount as reflected by the credit account may fluctuate. For example, prior to engaging in a gaming activity, a player, through the use of a cashier for example, may initially deposit a credit amount in the credit account in exchange for a credit-card type deposit or other type of deposit. Thereafter, the credit amount may fluctuate as a player engages in one or more gaming activities and gaming server 110 causes the player's winnings and/or losses to be added to and subtracted from the credit account. Similarly, a player, through a cashier, may deposit additional funds to and/or withdraw funds from the credit account. According to an embodiment of the invention, as a player engages in one or more convenience services, gaming server 110 may also cause purchase costs and/or earnings associated with these services to be subtracted from and/or added to the credit account. One skilled in the art will recognize that the credit amount may fluctuate in other ways.

The credit information may also include a transaction history of the credit account as the credit amount fluctuates through deposits, withdrawals, winning, losses, purchase costs, and earnings.

The credit information may also include one or more credit limits, including wagering/betting limits assigned to a player in connection with gaming activities. For example, a single wagering/betting limit may be assigned to one or more gaming activities engaged by a player. Alternatively, one or more gaming activities may have an assigned wagering/betting limit The credit limits may also include one or more spending limits assigned to a player in connection with convenience services. As a player engages in one or more gaming activities and/or convenience services, the gaming server may dynamically fluctuate a player's wagering/betting limits and spending limits One skilled in the art will recognize that the player profile information may include other types of credit information of a player.

According to an embodiment of the invention, the player profile information may also include information associated with one or more convenience services engaged in by a player, which information gaming server 110, for example, may monitor and maintain. Information associated with one or more convenience services engaged in by a player may include, for example, reservations and/or appointments made by a player, items purchased by a player, and purchase costs and/or deposit amounts associated with reservations, appointments, and items made/purchased by a player. One skilled in the art will recognize that the player profile information may include other types of information associated with one or more convenience services engaged in by a player. One skilled in the art will also recognize that other types of player profile information in addition to that disclosed herein may be created, maintained, and modified.

One skilled in the art will recognize that database 180 may be implemented such that one or more pieces of player profile information as disclosed herein, in addition to other player profile information, may be used to access and, for example, to index database 180 in order to obtain one or more other pieces of player profile information.

Figure 3:
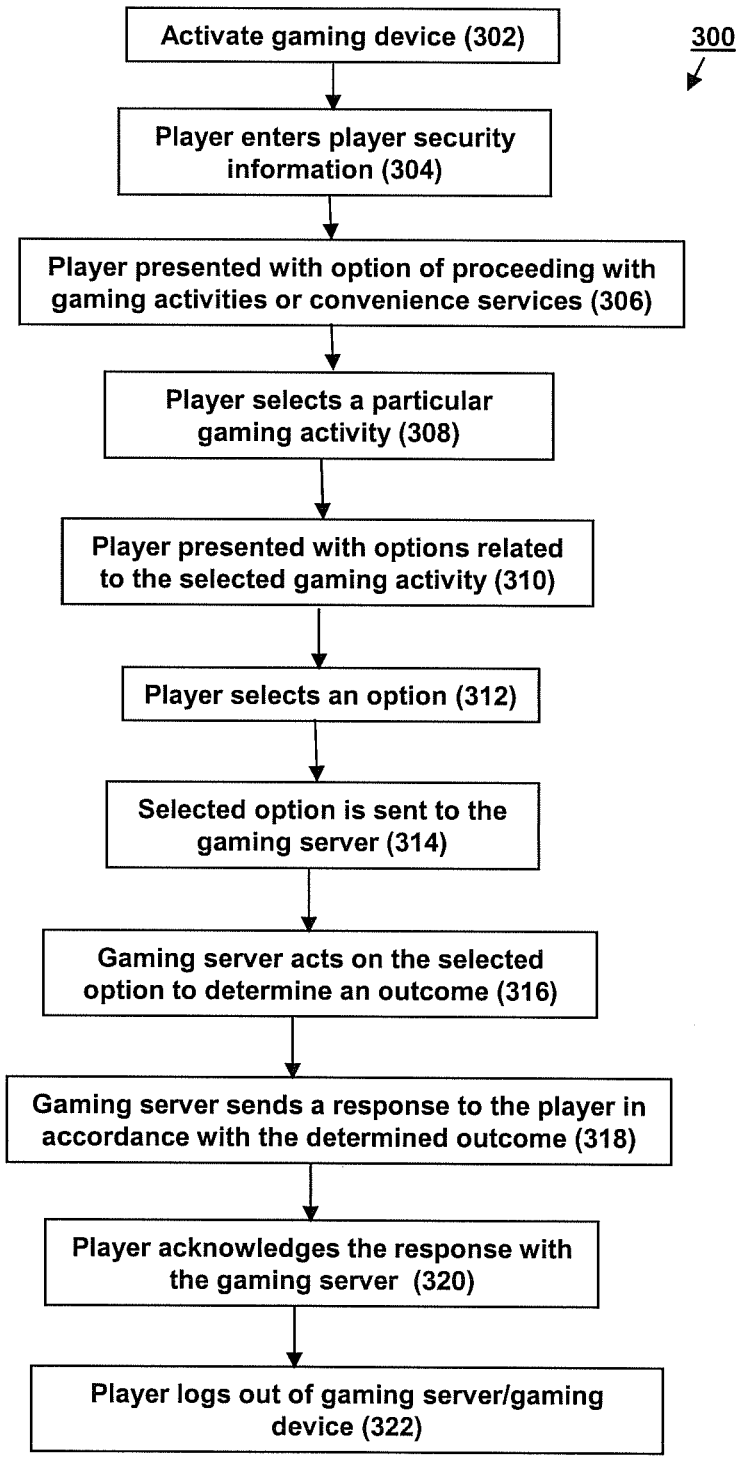
FIG. 3 shows an example process according to an embodiment of the invention for engaging in a gaming activity and/or convenience service using the gaming system shown in FIG. 1.

Referring now to FIG. 3, there is shown an example process 300 for engaging in a gaming activity and/or convenience service according to an embodiment of the invention. One skilled in the art will recognize that numerous other scenarios are possible. Beginning with step 302, a player 102 may first activate a gaming device 130 by, for example, turning on the device. As a result of being activated, gaming device 130 may automatically connect to communications network 150 or player 102 may cause the gaming device to connect to the communications network. Thereafter, gaming device 130 may automatically establish communications with gaming server 110 or player 102, by selecting an option and/or entering a command, may cause the gaming device to establish these communications. Thereafter, gaming server 110 may load one or more applications 140 onto the gaming device. Referring to step 304, gaming server 110 and/or gaming device 130 may next cause player 102 to possibly enter player identification information and may also cause player 102 to enter player security information including, for example, a login and password and possibly biometric information. According to other embodiments of the invention, a gaming device, when initially used by a player, may already be activated and in communications with gaming server 110. Here, process 300 may begin at step 304, for example.

Assuming the player enters the correct player security information, gaming server 110 and/or gaming device 130 may next present player 102 with the option of proceeding with gaming activities or possibly convenience services (step 306). Assuming the player chooses to proceed with gaming activities, a gaming environment may be presented to the player. For example, the gaming environment may include a casino lobby where the player is presented with broad categories of gaming activities including, for example, gambling activities, wagering on an event, lottery activities, etc. Assuming the player selects a particular category, the player may then be presented with specific types of gaming activities from which to choose.

Proceeding to step 308, player 102 may select a particular gaming activity, such as a particular casino table game. In step 310, the gaming server and/or gaming device may next present the player with one or more options related to the selected gaming activity. In step 312, the player may then select an option. For example, the player may place a wager or draw a card. In step 314, the gaming device 130 may accept the selected option and may transmit the selected option to the gaming server 110. In step 316, the gaming server may then act on the selected option.

For example, the gaming server may determine an outcome, such as won or lost and/or an amount won or lost, based on, for example, an amount wagered and any applicable odds. For certain gambling activities, such as a table game or slot machine, a random number generator may be incorporated to determine an outcome.

Thereafter in step 318, the gaming server may prepare a response to the player in accordance with the determined outcome, and send the response to the gaming device/player. In step 320, the player may acknowledge the response with the gaming server. For example, the player may acknowledge that a hand of blackjack has been won and may acknowledge the designated payout. In step 322, the player may then log out of the gaming server/gaming device.

According to an embodiment of the invention, gaming server 110 may be a trusted server (e.g., a "licensed server"/ "licensed gaming server") in that a gaming service provider 172, gaming facility 174, and/or gaming authority 176 may have mechanisms in place to ensure the server has not been tampered with. For example, a gaming service provider 172, gaming facility 174, and/or gaming authority 176 may have mechanisms in place to physically secure (e.g., limit access to) the gaming server 110 and/or to check the authenticity of applications 116 that provide the gaming activities and convenience services. According to an embodiment of the invention, gaming server 110, for example, may also have mechanisms in place to ensure a gaming device 130 has not been tampered. For example, as is known in the art, gaming server 110 may have mechanisms to check the authenticity of applications 140 on a gaming device. Accordingly, as a player uses a gaming device 130 to engage in one or more gaming activities or convenience services, gaming server 110 may ensure the gaming device has not been tampered and may discontinue the activity or service, for example, if an issue is detected.

Notably, from the perspective of a player 102/104 using a gaming device 130, it would also be desirable to have a mechanism for the player to ensure that the gaming device has not been tampered with, thereby causing the gaming device, unknown to the player, to be in communications with a bogus/malicious gaming server rather than a licensed gaming server 110 as provided by a gaming service provider 172 and/or gaming facility 174. In other words, when a player uses a gaming device to engage in one or more gaming activities or convenience services with a gaming server, it would be desirable to provide the player with a mechanism such that the player may verify that the gaming device is in fact communicating with a "licensed gaming server" (i.e., gaming server 110).

Figure 4:
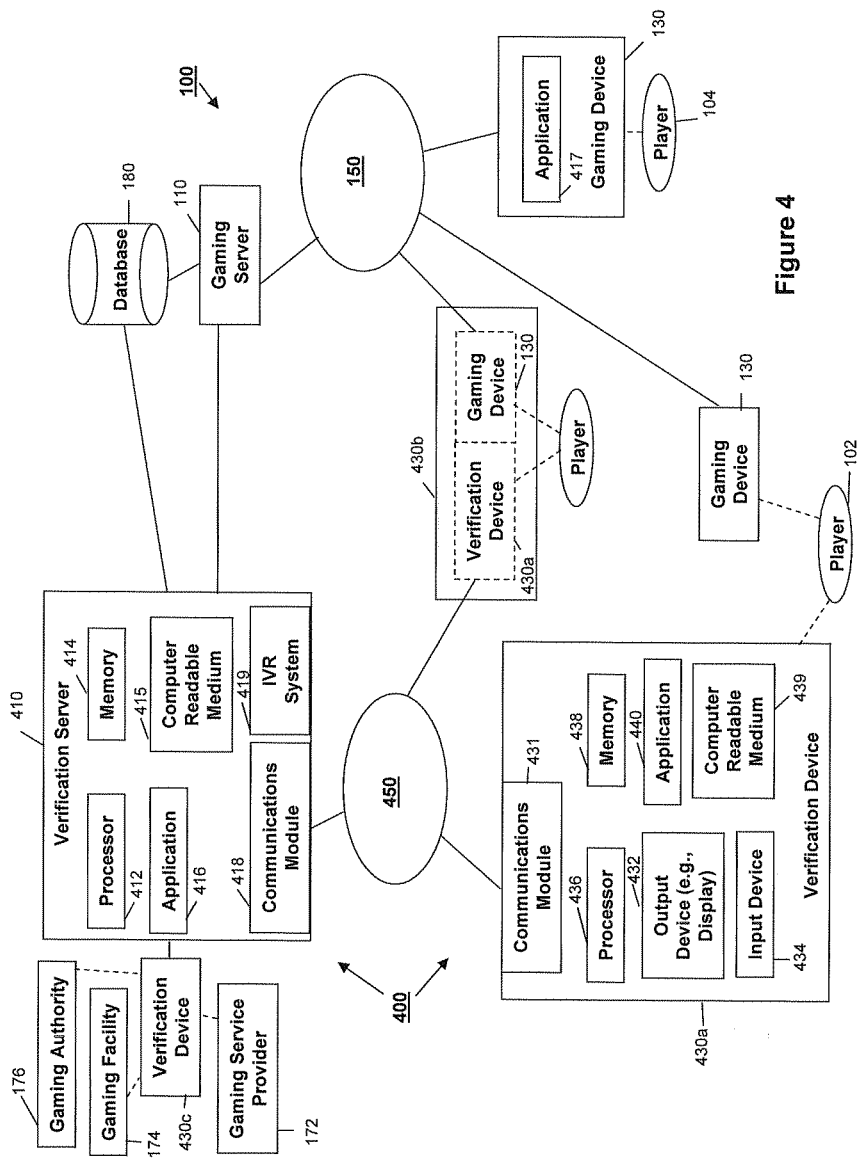
FIG. 4 shows a verification system in combination with the gaming system of FIG. 1 according to an embodiment of the invention, which verification system may be used to verify whether a gaming device is in communications with a licensed gaming server.

Referring now to FIG. 4 there is shown a verification system 400 according to an embodiment of the invention. Verification system 400 may include a verification server 410, one or more verification devices 430a/430b/430c that provide players 102/104, for example, access to verification system 400, and a communications network 450 through which verification server 410 and verification devices 430a/ 430b may communicate. According to an embodiment of the invention, verification server 410 provides one or more "verification services" to one or more players 102/104 of gaming system 100 and in particular, enables a player to verify, possibly through the use of a verification device 430a/430b/430c, that the gaming device 130 that the player is using is in communications with a licensed gaming server 110, rather than a bogus/malicious gaming server.

In particular, according to an embodiment of the invention, verification server 410 may be any computing device operable to provide one or more verification services as disclosed herein. As shown in FIG. 4, verification server 410 may be a computing device separate from gaming server 110. Here, verification server 410 may include one or more processors, such as processor 412, memory 414, and one or more applications, such as application 416, each of which may be operable to provide a verification service as disclosed herein. Each application 416 may be embodied as one or more software modules that reside in memory 414 and execute on processor 412. Alternatively or in addition, an application 416 may be embodied as one or more firmware and/or hardware modules. Verification server 410 may also include one or more communications modules 418 for interfacing with communications network 450 (and possibly other communications networks) and for transmitting and/or receiving verification information with verification devices 430a/430b. Verification information may include any information that is necessary and/or desirable in the operation of a verification service as further disclosed herein and in particular, may include any information exchanged between verification server 410 and a verification device 430 and/or any information exchanged between verification server 410 and a gaming device 130. Verification server 410 may also include one or more interactive voice response (IVR) systems, such as system 419, to allow players, for example, to interact with verification server 410 in an automated fashion, as further disclosed herein. Verification server 410 may also include a computer readable medium 415 for storing, for example, one or more applications 416. While verification server 410 is shown as a single server, one skilled in the art will recognize that verification server 410 may include a plurality of servers, including redundant servers. According to an embodiment of the invention, verification server 410 may, at least in part, be a web server, such as an http web server.

According to an embodiment of the invention and as further shown in FIG. 4, verification server 410 may also be interconnected to licensed gaming server 110, as represented by connection 452. According to an embodiment of the invention, connection 452 may be a communications network, such as data communications network, and may be a network separate from or part of communications network 150 and/or communications network 450. Accordingly, verification server 410 and gaming server 110 may also include one or more communications modules (not shown) for communicating over communications network 452. One skilled in the art will recognize that mechanisms other than a communications network 452 may be used to interconnect verification server 410 and gaming server 110.

According to an embodiment of the invention and as further disclosed herein, verification server 410 may exchange, via gaming server 110, verification information with a gaming device 130 in order to verify for a player using the gaming device that the device is in communications with gaming server 110. In other words, according to an embodiment of the invention, verification server 410 may transfer verification information to and/or receive verification information from a gaming device 130, which information may pass through communications network 150 and connection 452, and in particular, may pass via licensed gaming server 110. By having the verification information pass via licensed gaming server 110, verification is made that the gaming device is in communications with licensed gaming server 110, and not some other malicious server. According to this embodiment of the invention, gaming server 110 may include any mechanism known in the art to enable the passing of verification information between verification server 410 and gaming devices 130.

Although verification server 410 is shown in FIG. 4 as being connected to a single gaming server 110/gaming system 100, according to other embodiments of the invention verification server 410 may be interconnected to a plurality of gaming servers 110, each provided by and/or controlled by a different gaming service provider and/or a gaming facility, for example. Here, verification server 410 may provide verification services for players using gaming devices 130 on any of these gaming systems.

Although verification server 410 is shown in FIG. 4 as being a separate computing device from gaming server 110, one skilled in the art will recognize that alternative implementations of verification server 410 are possible, such as gaming server 110 including verification server 410. In other words, according to an embodiment of the invention, gaming server 110 and verification server 410 may be the same system. For example, according to an embodiment of the invention, verification server 410 may be a physical entity within/physically a part of gaming server 110. Here, gaming server 110 may include one or more processors, such as processor 412, memory 414, and one or more applications, such as application 416, which processors/memory/applications may represent verification server 410. According to another embodiment of the invention, verification server 410 may be a logical entity within gaming server 110 such that gaming server 110 again includes verification server 410. For example, gaming server 110 may include one or more applications, such as application 416, that execute as one or more processes on gaming server 110, which processes may represent verification server 410.

According to these various alternative embodiments, gaming server 110 may also include one or more communications modules 418 for "verification server" 410 to interface with communications network 450 and to transmit and/or receive verification information to/from verification devices 430a/430b. In addition, gaming server 110 may include one or more IVR systems, such as system 419, to allow players, for example, to interact with "verification server" 410 in an automated fashion. Furthermore, gaming server 110 may also include any mechanism known in the art for "verification server" 410 to transfer verification information to and/or to receive verification information from a gaming device 130 and as such, verification information may still be considered to pass between verification server 410 and a gaming device 130 via gaming server 110. One skilled in the art will recognize that other implementations of verification server 410 and/or gaming server 110 are possible.

Referring again to FIG. 4, verification server 410 may also be operable to access one or more databases, such as database 180. Depending on the implementation of database 180 as disclosed herein and/or the implementation of verification server 410 as disclosed herein, the verification server may access database 180 directly (as represented by connection 454) and/or may access database 180 via gaming server 110.

According to an embodiment of the invention, verification server 410 and the associated applications 416 may be provided by and/or controlled by a gaming service provider 172, a gaming facility 174, and/or a gaming authority 176 and may be within the geographic boundaries of any one or more of these entities. In addition, when verification server 410 and gaming server 110 are separate entities, the servers may be co-located and/or remotely located from one another.

According to an embodiment of the invention, verification server 410 may be a trusted server (a "licensed server"/ "licensed verification server") in that a gaming service provider 172, gaming facility 174, and/or gaming authority 176 may physically secure (e.g., limit access to) the verification server and/or have mechanisms to check the authenticity of applications 416, for example. According to an embodiment of the invention and as further disclosed herein, different mechanisms may also be provided such that a player 102/104 using a verification device 430 to access verification server 410 may verify that the verification server is a "licensed verification server" rather than a bogus server.

Referring now to verification devices 430*a*, 430*b*, and 430*c*, according to an embodiment of the invention these devices provide a player 102/104 with access to verification system 100 and in particular, enable a player to use a verification service as provided by verification server 410 in order to verify that a gaming device 130 being used by the player is in communications with a licensed gaming server 110. According to different embodiments of the invention as disclosed herein, verification system 100 may include only verification devices 430*a*, 430*b*, or 430*c*, or alternatively, may include some combination of these devices. In addition, for each verification device 430*a*, 430*b*, and 430*c*, verification system 400 may include one or multiple types of each device, as further disclosed herein.

Referring to verification devices 430*a*, according to an embodiment of the invention, these devices may include any device operable to interface with communications network 450, operable to transmit verification information to and/or to receive verification information from verification server 410, and operable to present verification information to and/or to receive verification information from a player. According to an embodiment of the invention, a verification device 430*a* may be a POTS phone, a mobile/cellular phone, an IP phone, a PDA, a pocket PC, a personal computing device, a pager, a terminal, or a kiosk. According to an embodiment of the invention, verification system 400 may include different types of verification devices 430*a*. One skilled in the art will recognize that other types of verification devices 430*a* are possible.

According to an embodiment of the invention, a verification device 430*a*, other than possibly a kiosk or terminal, may be owned by a player 102/104. Alternatively, a gaming facility 174, a gaming service provider 172, and/or a gaming authority 176 may provide one or more verification devices 430 that may be used by players. In this latter case, the verification device may be a stationary device (e.g., a kiosk) or a device tethered to and/or mounted to a stationary object (e.g., a wall), and may be located within a gaming area/ location of a gaming facility 174 or any other location. According to an embodiment of the invention, when a gaming facility, a gaming service provider, and/or a gaming authority provides a verification device 430*a*, the device may be placed in a conspicuous location, thereby providing a player using the verification device with a degree of trust that the verification device has not been tampered with and is accessing a "licensed verification server" 410 when used.

Referring again to FIG. 4, according to an embodiment of the invention, a verification device 430*a* may include a communications module 431 for interfacing with communications network 450 and for transmitting and/or receiving verification information to/from verification server 410. Verification device 430*a* may also include at least one output device for conveying verification information to a player, such as at least one display 432, one or more LEDs, and/or at least one audio output. Verification device 430*a* may also include at least one input device 434, such as a mouse, a touch-sensitive pad, a pointer, a stylus, a trackball, a button, a keypad and/or keyboard with one or more keys representing alphanumeric characters, a wheel, a touch-sensitive monitor, and/or an audio input, thereby allowing a player to enter verification information. Verification device 430*a* may also include one or more processors, such as processor 436, memory 438, and a computer readable medium 439.

According to an embodiment of the invention, a verification device 430*a* may not include any applications (e.g., software, firmware, and/or hardware modules) specific to verification system 400. According to another embodiment of the invention, a verification device 430*a* may include one or more applications, such as application 440, that operate in conjunction with applications 416 to provide one or more verification services. Each application 440 may be embodied as one or more software modules that reside in memory 438 and execute on processor 436 and/or may be embodied as one or more firmware and/or hardware modules. When an applications 440 s embodied as one or more software modules, these software modules may be pre-loaded on a verification device, stored on computer readable medium 439 for example, and/or may be loaded from verification server 410, for example, when a verification service is used (e.g., as a web application). One skilled in the art will recognize that other configurations are possible. According to an embodiment of the invention, a verification device 430*a* may, at least in part, operate as a web client (e.g., include a Web browser).

Referring to verification devices 430*b*, according to an embodiment of the invention, these devices include any device operable to function as both a verification device 430*a* and a gaming device 130, as disclosed herein. Accordingly, a verification device 430*b* may be a verification device that is integral with a gaming device 130. An example of such a device may include a gaming device 130 operable to provide a player with one or more gaming activities and possibly convenience services, and also one or more communication services, such as telephony and/or data communication services, as disclosed herein. According to an embodiment of the invention, a verification device 430*b* may be a stationary device or a device tethered to a stationary object, or may be a mobile device. In addition, the device may be provided to a player by a gaming facility 174 and/or a gaming service provider 172 or may be owned by a player.

Referring to verification devices 430*c*, according to an embodiment of the invention, these devices include any mechanism operable to directly interface with verification server 410 in order to transmit verification information thereto and/or to receive verification information there from, and operable to present verification information to and/or to receive verification information from a player, for example. In particular, according to an embodiment of the invention, a verification device 430*c* may be one or more output devices interfaced to verification server 410, such as a display, one or more LEDs, and/or an audio output. Alternatively or in addition, a verification device 430*c* may be one or more input devices interfaced to verification server 410, such as a mouse, a touch-sensitive pad, a pointer, a stylus, a trackball, a button, a keypad and/or keyboard with one or more keys representing alphanumeric characters, a wheel, a touch-sensitive monitor, and/or an audio input. According to an embodiment of the invention, verification system 400 may include different combinations of verification devices 430*c*. One skilled in the art will recognize that other types of verification devices 430*c* are possible.

According to an embodiment of the invention, a gaming facility 174, a gaming service provider 172, and/or a gaming authority 176 may control access to a verification device 430a and/or 430c and/or may operate such a device on behalf of a player in order for the player to verify that the player's respective gaming device 130 is in communications with a licensed gaming server 110. More specifically, according to an embodiment of the invention as disclosed herein, an attendant associated with a gaming facility, a gaming service provider, and/or a gaming authority, for example, may be positioned at a location within a gaming facility, such as at a booth, and may have access to one or more verification devices 430a/430c. A player may request that this attendant verify, on behalf of the player, a gaming device 130 being used by the player. As further disclosed herein, the player may provide verification information to the attendant for the attendant to enter into the verification device and/or may receive verification information from the attendant that the attendant obtained from the verification device. According to an embodiment of the invention, such an attendant may be located at a conspicuous location, thereby providing a player with a degree of trust that the attendant is valid and is accessing a "licensed verification server" 410 to verify the player's gaming device.

According to another embodiment of the invention as disclosed herein, an attendant associated with a gaming facility, a gaming service provider, and/or a gaming authority, for example, may be positioned at a call or data center, for example, and have access to one or more verification devices 430a/430c. A player may contact such an attendant, via phone or data connection for example, and request that the attendant verify, on behalf of the player, a gaming device 130 being used by the player. According to an embodiment of the invention, a phone number or data address, for example, used by the player to contact the attendant may be posted at a conspicuous location within a gaming facility, for example, thereby providing a player with a degree of trust that the attendant is valid and is accessing a "licensed verification server" 410 to verify the player's gaming device.

Referring now to communications network 450, according to an embodiment of the invention, this network provides a mechanism for verification devices 430a/430b and verification server 410 to exchange verification information. As further disclosed herein, the verification information may be transmitted in whole, or in combination, as graphical, textual, and/or as audible information and may be transmitted in any format including digital and/or analog. According to an embodiment of the invention, communications network 450 may be a wireline and/or wireless network, including a telephony and/or data communications network, and may be based on any known and/or future transport technologies. Communications network 450 may be a private and/or public network, and may include, at least in part, the public Internet.

According to an embodiment of the invention, communications network 450 may include a plurality of different networks, which may or may not be interconnected and which may or may not be based on different transport technologies. Verification server 410 may interface each network individually and/or may interface one or more networks through a common access point. Different verification devices 430a/430b may interface different networks and may use different technologies to access verification server 410.

According to different embodiment of the invention, communications network 450 and communications network 150 may or may not share common resources, and may or may not be interconnected. According to an embodiment of the invention, communications network 450 and communications network 150 are the same network.

One skilled in the are will recognize that the scope of coverage of verification network 450 may vary, and in particular, may provide verification devices 450a/450b access to verification server 410 from gaming area/locations within a gaming facility, and/or beyond a gaming facility.

Figure 5:
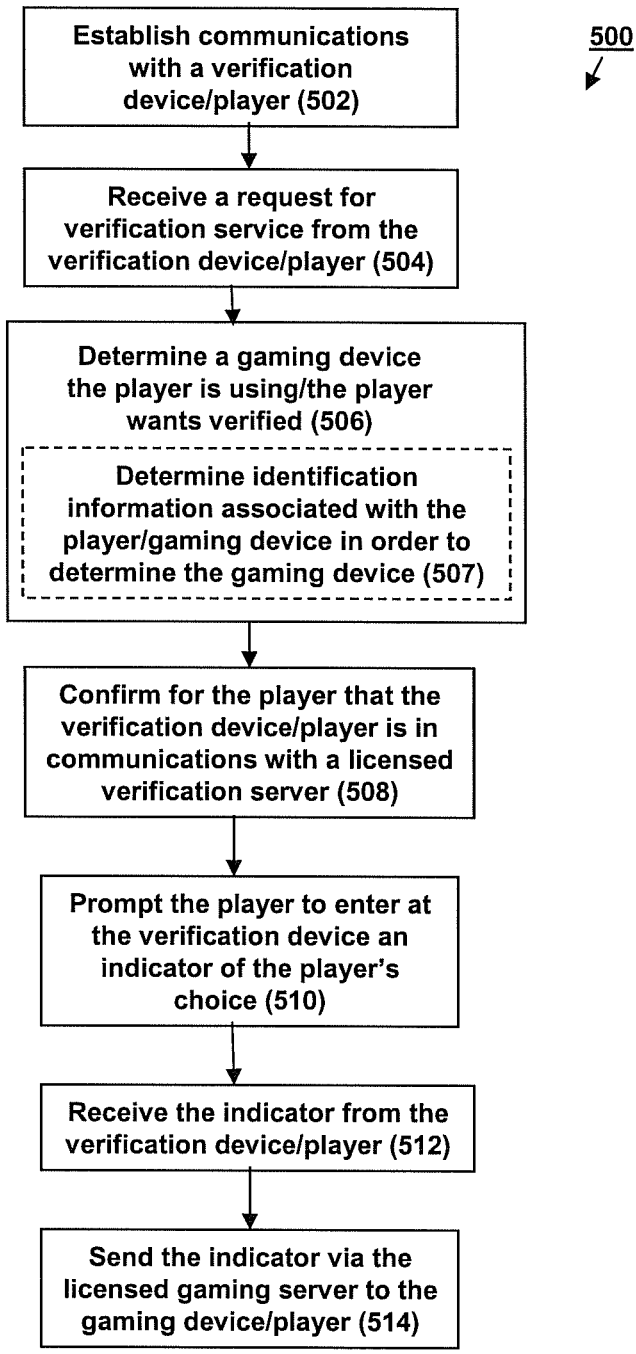
FIG. 5 shows a verification service provided by the verification system of FIG. 4 according to an embodiment of the invention.

Referring now to FIG. 5, there is shown steps of a verification service 500 according to an embodiment of the invention, which service is provided through a combination of verification server 410, a verification device, and a gaming device. One skilled in the art will recognize that while verification service 500 is described as a sequence of ordered steps, the specific order of these steps may vary, one or more steps may be combined, and not all steps may be required.

According to this embodiment, it is assumed a player is using a gaming device 130 that is already in communications with a gaming server, presumably a licensed gaming server 110. If required, it is also assumed the player has already entered any required player identification information and/or player security information. It should be noted that according to this embodiment of the invention, gaming device 130 may require one or more applications (as represented by application 417 in FIG. 4) (pre-loaded and/or dynamically loaded, for example) that operate in conjunction with applications 416 on the verification server to provide verification service 500.

According to this embodiment of the invention, the player may have just started using the gaming device (e.g., just turned the device on and/or entered player identification/security information), may be currently engaged in one or more gaming activities and/or convenience services, and/or may have completed one or more gaming activities and/or convenience services. In addition, the player may have previously used gaming device 130 and subsequently turned the device off and/or logged out of the device, before the current use of the device. Similarly, the player may have used other gaming devices prior to the current use of the present device. According to this embodiment of the invention, the player may now want to verify that gaming device 130 is in fact in communications with a licensed gaming server 110, rather than a bogus/malicious gaming server.

According to this embodiment of the invention, the verification device 430a/430b/430c used to verify the gaming device need be at least operable to receive verification information from a player/attendant and to convey this information to verification server 410. Nonetheless, the verification device is also preferably operable to receive verification information from verification server 410 and to convey this information to a player/attendant. For description purposes only, verification service 500 will be described assuming that a player has a verification device 430a or 430b (i.e., the gaming device 130 to be verified is integral with the verification device), and is using this device directly (i.e., not through an attendant) to verify the gaming device the player is using.

Beginning with step 502, verification server 110 may initially establish communications with the verification device 430a/430b via communications network 450. The player may initially cause the verification device to establish communications with verification server 410. As an example, if the verification device is a phone or personal computing device, the player may enter an address of the verification server, such as phone number or data address, such as a URL. According to an embodiment of the invention, the player may obtain this address from conspicuous postings throughout a gaming facility and/or from audible announcements, for example. As indicated above, by making the address available in such fashions, a player may obtain a degree of trust that by using the address, the player is accessing a "licensed verification server" 410. According to another embodiment of the invention, the address may be printed, for example, on gaming device 130 or made available by the gaming device through a display 132, for example. If the verification device is provided by a gaming authority, gaming facility, and/or gaming service provider, for example, the address may be printed on the verification device or made available by the verification device through a display 432, for example. One skilled in the art will recognize that the player may obtain the address in other ways.

According to an embodiment of the invention, when a gaming authority, gaming facility, and/or gaming service provider provides the verification device, the device may have consistent communications with verification server 410, thereby not requiring, for example, that the player establish communications with verification server 410. According to another embodiment of the invention, when a verification device is provided by such an entity, the device may be configured to automatically establish communications with verification server 410. For example, when the verification device is a phone, the phone may be configured to establish communications with verification server 410 when taken off-hook. Similarly, when the verification device is a kiosk, for example, the kiosk may include, for example, a hard button, or a soft button and/or display option made available through a display 432 that the player may depress/select to cause the device to establish communications with verification server 410.

Referring to step 504, verification server 410 may next receive a request for verification service from the player via the verification device. The player may make the request as an audible command, an audible tone (e.g., selecting an alphanumeric button on a phone), by depressing a hard button, or by selecting a soft button and/or display option made available through a display 432, for example. The request may be made in response to receiving a prompt (e.g., audible, textual, and/or graphical prompt) from the verification server and/or verification device. According to another embodiment of the invention, verification server 410 may consider the mere establishing of communications with the verification device as a verification service request, in which case step 504 is not needed. According to an embodiment of the invention, the request for verification service from the player may include a request for a particular type of verification service, as disclosed herein.

Referring to step 506, verification server 410 may next determine the gaming device 130 that the player wants to verify and in particular, may determine the gaming device such that the verification server may subsequently communicate in any fashion with the gaming device via gaming server 110, as further disclosed herein. According to an embodiment of the invention, verification server 410 may determine the gaming device by determining identification information associated with the player and/or gaming device (step 507). According to an embodiment of the invention, the verification server may determine such identification information by receiving the identification information from the verification device/player. One skilled in the art will recognize that the verification server 410 may determine identification information in other fashions.

According to an embodiment of the invention, the identification information may include, for example, player identification information (e.g., the player's name), player security information (e.g., the player's login to gaming server 110), and/or information relating to the gaming device 130 (e.g., a tracking value or name of the gaming device) as disclosed herein. One skilled in the art will recognize that the identification information may include other types of information. According to an embodiment of the invention, the identification information itself may allow the verification server to determine the gaming device and to subsequently communicate in any fashion with the gaming device via gaming server 110. According to another embodiment of the invention, the verification server may use the identification information as an index, for example, to access database 180, for example, and the player's profile information and to thereby determine the gaming device and in particular, to determine any information necessary to subsequently communicate with the gaming device via gaming server 110. (For example, the identification information may include the player's name, which information may be used to access database 180 and thereby determine a name/address of the gaming device assigned to the player. As another example, the identification information may include a tracking value of the gaming device, which information may be used to access database 180 and thereby determine an address of the gaming device.)

When the verification server receives the identification information from the verification device, the player may enter this identification information at the verification device, possibly coincident with the request for verification or possibly in response to receiving a prompt from the verification server and/or verification device. With respect to information relating to the gaming device 130, the player may obtain the information from the gaming device, such as from information printed on the gaming device and/or made available by the gaming device through a display 132, for example. According to another embodiment of the invention, the verification device may have a mechanism for obtaining the identification information from the gaming device and for thereafter sending the information to the verification server. For example, according to an embodiment of the invention, the verification device may be a kiosk that includes a reader (e.g., an optical scanner, magnetic card reader, RFID transceiver) for reading information printed and/or encoded on/within the gaming device (e.g., a tracking value). As another example, the verification device and gaming device may include communication interfaces that allow the verification device to obtain the identification information from the gaming device.

Referring next to step 508, verification server 410 may optionally confirm for the player that the player/verification device is in communications with a licensed verification server 410. According to an embodiment of the invention, the verification server may use the above described identification information as an index, for example, to database 180 to access the player's profile information and thereby obtain player security information related to the player, for example, such as personal information associated with the player (e.g., the player's maiden name, a name of the player's pet, etc.) and/or a random value specified by the player, as disclosed herein. Alternatively, the verification server and/or verification device may prompt the player for additional identification information and use such information to access database 180 to obtain player security information related to the player. Thereafter, the verification server may send the player security information to the verification device, causing the verification device to provide the information to the player as audible and/or displayed information. In this fashion the player is able to verify that the verification device is in communications with a licensed verification server 410.

Referring next to step 510, the verification server may next cause the verification device to prompt the player to enter at the verification device an indicator of the player's choice. Upon receiving this indicator from the verification device (step 512), the verification server may then send the indicator (step 514), via gaming server 110, to the gaming device, causing the gaming device to make the indicator known to the player. According to this embodiment of the invention, the indicator as specified by the player at the verification device and as received by the verification server may be any alphanumeric text value, a plurality of alphanumeric text values, an audible signal, an audible tone, an audible text value, a plurality of audible text values, or some combination thereof. Alternatively or in addition, the indicator may include player security information related to the player, such as personal information associated with the player as disclosed herein. One skilled in the art will recognize that the indicator may take other forms. Regardless of the type of indicator, the player may enter the indicator at the verification device by speaking the indicator into an audio input (such as a phone receiver), by entering the indicator via a keypad or keyboard, or by using any other of numerous input devices as disclosed herein. The verification server may in turn send the indicator to the gaming device in the same form as received from the verification device. According to another embodiment of the invention, the verification server may alter the form of the indicator prior to sending the indicator to the gaming device, thereby causing the gaming device to make the indicator known to the player in a different form than entered. For example, the verification server may receive the indicator from the verification device/player as an audible text value, convert the audible text value to an equivalent alphanumeric text value, and then send the equivalent alphanumeric text value to the gaming device, which alphanumeric text value may then be displayed to the player.

According to another embodiment of the invention, rather than the indicator traveling from the verification device to the gaming device, the verification server may cause the verification device to prompt the player to enter the indicator at the gaming device. Upon receiving this indicator via gaming server 110 from the gaming device, the verification server may then send the indicator to the verification device, causing the verification device to make the indicator known to the player.

According to another embodiment of the invention, the verification device may have a mechanism for obtaining information from the gaming device, as similarly disclosed above in relation to step 507 of verification service 500 with respect to the identification information. Here, the verification device may retain the indicator sent to verification server and may also obtain the indicator received at the gaming device and perform a match of the two indicators on behalf of the player.

According to another embodiment of the invention, rather than taking the indicator received from the verification device and sending this indicator to the gaming device, the verification server may access the player's profile information (e.g., the verification server may use the identification information obtained in step 507 as an index, for example, to database 180 in order to access the player's profile information) and may use the indicator to determine some other information known to the player (which information may be generally referred to in the context of this embodiment as a second indicator). The verification server may then send this information (i.e., second indicator) to the gaming device via the gaming server, causing the gaming device to make the information known to the player. For example, the indicator may be "What is my mother's maiden name?" and the second determined indicator may by "Smith".

As such, according to this embodiment of the invention, by passing an indicator(s) between the verification device 430*a*/430*b* and gaming device 130 via the licensed verification server 410 and licensed gaming server 110 and in which the indicator(s) is both originated by and received by the player (i.e., known to the player), the player is able to verify that the gaming device is in communications with the licensed gaming server 110, rather than a bogus/malicious gaming server. Notably, if the player does not receive the indicator at the gaming device/verification device or receives a different indicator than sent/expected, the player may conclude that the gaming device may not be in communications with a licensed gaming server 110 and should seek assistance.

As disclosed herein, verification service 500 was described with respect to a verification device 430*a* or 430*b*. One skilled in the art will recognize that verification service 500 may also be provided using a verification device 430*c*. In particular, a player may use a verification device 430*c* to verify a gaming device 130 as similarly described above for verification device 430*a* or 430*b*.

According to another embodiment of the invention, a player may interact with an attendant associated with a gaming facility 174, a gaming service provider 172, and/or a gaming authority 176, which attendant may use a verification device 430*a* and/or 430*c* to verify a gaming device 130 on behalf of a player. As indicated, this attendant may be located at a booth, for example, or accessible via a call or data center, for example. According to this embodiment of the invention, rather than the player using a verification device to communicate with verification server 410 to verify a gaming device the player is using, the player will communicate with the verification server via an attendant, who will in turn communicate with the verification server.

According to another embodiment of the invention, a verification service may resemble verification service 500 from steps 502 through 508, for example. Thereafter, rather than prompting the player to enter an indicator at either the verification device or gaming device and passing the indicator to the other, according to this embodiment of the invention the verification server may determine a random indicator unknown to the player. Thereafter, the verification server may send the indicator, via gaming server 110, to the gaming device, causing the gaming device to make the indicator known to the player, and may also send the indicator to the verification device, causing the verification device to also make the indicator known to the player. Assuming the player receives the indicator at the gaming device and the two indicators match, the player is able to verify that the gaming device is in communications with the licensed gaming server 110, rather than a bogus/malicious gaming server. Alternatively, if the player does not receive the indicator at the gaming device or receives a different indicator than received at the verification device, the player may conclude that the gaming device may not be in communications with a licensed gaming server 110 and should seek assistance. According to another embodiment of the invention, the verification device may have a mechanism for obtaining information from the gaming device, as similarly disclosed above in relation to step 507 of verification service 500 with respect to the identification information. Here, the verification device may obtain the indicator received at the gaming device and perform the match for the player.

According to these embodiments of the invention, the indicator as specified by the verification server may be any alphanumeric text value, a plurality of alphanumeric text values, an audible signal, an audible tone, an audible text value, a plurality of audible text values, or some combination thereof. One skilled in the art will recognize that the indicator may take other forms. Regardless of the type of indicator, the verification server may send the indicator to the verification device and gaming device in the same form (e.g., both as an audible text value) or in different forms.

One skilled in the art will recognize that according to this embodiment of the invention, the player may use a verification device 430*a*/430*b*/430*c* to verify the gaming device, or the player may verify the gaming device through an attendant, which may be using any verification device 430*a*/430*c*, as similarly described above.

According to another embodiment of the invention, a verification service may again resemble verification service 500 from steps 502 through 508, for example. Thereafter, the verification server may determine a random indicator unknown to the player and may send the indicator, via gaming server 110, to the gaming device, causing the gaming device to make the indicator known to the player. The verification server may then prompt the player (via the verification device or gaming device), to specify/indicate via the verification device the indicator that was received at the gaming device (according to another embodiment of the invention, the verification device may have a mechanism for obtaining information from the gaming device, as similarly disclosed above, and may obtain the indicator received at the gaming device and automatically send the indicator to the verification server). The verification server may then match the indicator sent to the player via the gaming device to the value received from the player via the verification device and notify the player, via the verification device or gaming device, whether the two indicators match. Assuming the player receives the indicator at the gaming device and the two indicators match, the player is able to verify that the gaming device is in communications with the licensed gaming server 110. One skilled in the art will recognize that rather than the verification server sending the indicator to the gaming device, the verification server may send the indicator to the verification device and then prompt the player to specify/indicate the indicator via the gaming device, which may then send the indicator to the verification server via the gaming server.

According to another embodiment of the invention, a player may interact with an attendant associated with a gaming facility 174, a gaming service provider 172, and/or a gaming authority 176, which attendant may use a verification device 430*a* and/or 430*c* to verify a gaming device 130 on behalf of a player. According to this embodiment of the invention, a verification service may resemble verification service 500 from steps 502 through 508, for example. Thereafter, the attendant may determine a random indicator unknown to the player, specify the indicator to the player, and also enter the indicator at the verification device, causing the verification server to send the indicator, via gaming server 110, to the gaming device, and causing the gaming device to make the indicator known to the player. Assuming the player receives the indicator at the gaming device and the two indicators match, the player is able to verify that the gaming device is in communications with the licensed gaming server 110, rather than a bogus/malicious gaming server. Alternatively, if the player does not receive the indicator at the gaming device or receives a different indicator than that specified by the attendant, the player may conclude that the gaming device may not be in communications with a licensed gaming server 110 and should seek assistance.

According to a similar embodiment of the invention, the attendant may again determine a random indicator unknown to the player, and enter the indicator at the verification device, causing the verification server to send the indicator, via gaming server 110, to the gaming device, and causing the gaming device to make the indicator known to the player. Thereafter, the attendant may ask the player the indicator that was received at the gaming device and specify to the player whether this is match. Assuming the player receives the indicator at the gaming device and the two indicators match, the player is able to verify that the gaming device is in communications with the licensed gaming server 110.

Figure 6:
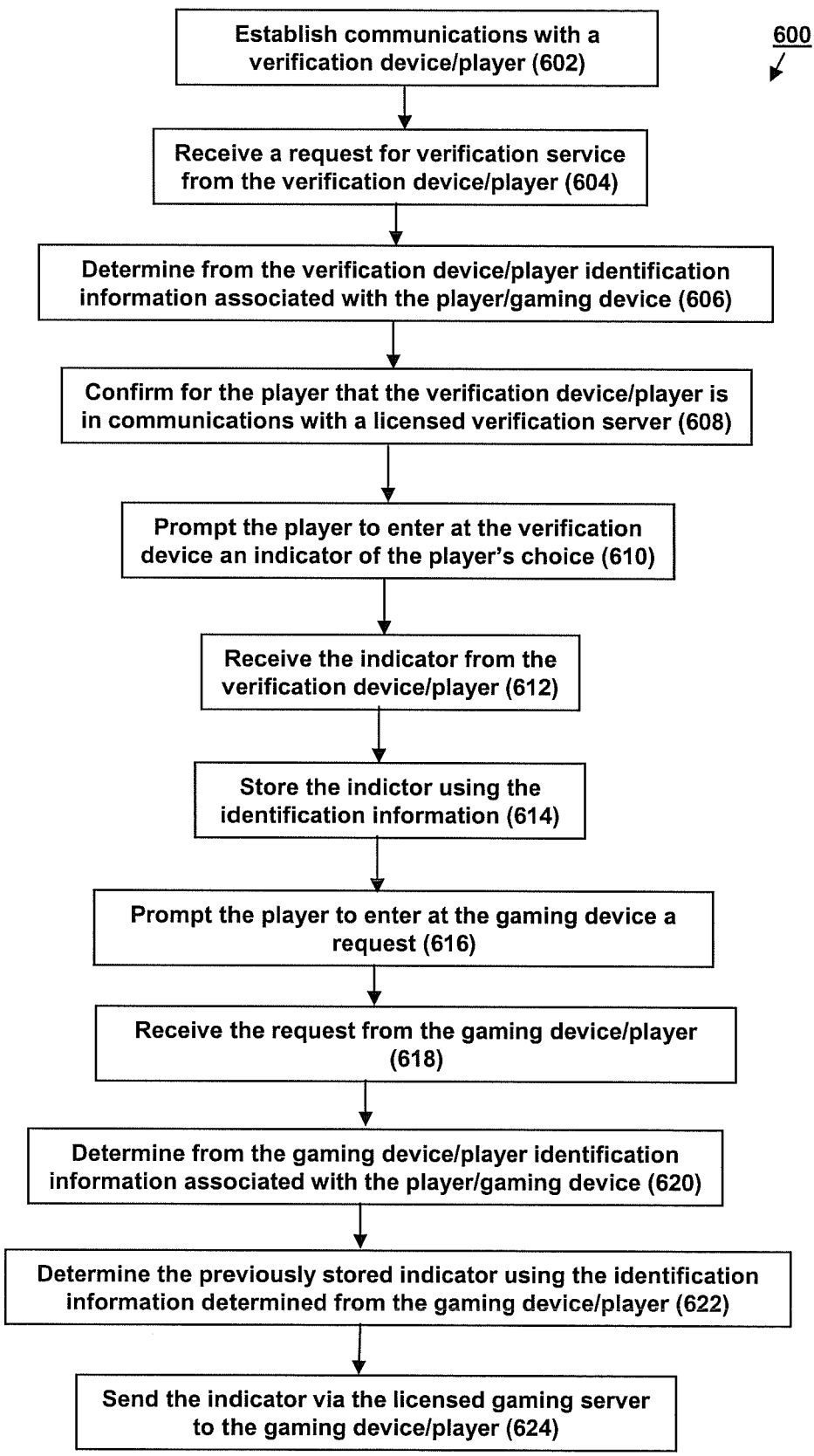
FIG. 6 shows another verification service provided by the verification system of FIG. 4 according to an embodiment of the invention.

Referring now to FIG. 6, there is shown steps of a verification service 600 according to another embodiment of the invention, which service is provided through a combination of verification server 410, a verification device, and a gaming device. One skilled in the art will recognize that while verification service 600 is described as a sequence of ordered steps, the specific order of these steps may vary, one or more steps may be combined, and not all steps may be required.

As similarly described for verification service 500, according to this embodiment, it is assumed a player is using a gaming device 130 that is already in communications with a gaming server, presumably a licensed gaming server 110, and that if required, the player has already entered any required player identification information and/or player security information. Similar to above, the player may be at any one of various states with respect to the player's use of the gaming device. It should be noted that according to this embodiment of the invention, gaming device 130 may require one or more applications (as represented by application 417 in FIG. 4) that operate in conjunction with applications 416 on the verification server to provide verification service 600.

According to this embodiment of the invention, the player may use a verification device 430*a*/430*b*/430*c* to verify the gaming device. Alternatively, the player may verify the gaming device through an attendant, which may be using any verification device 430*a*/430*c*, as similarly described above. According to this embodiment of the invention, the verification device 430*a*/430*b*/430*c* need be at least operable to receive verification information from a player and/or attendant and to convey this information to verification server 410, but is preferably also operable to receive verification information from verification server 410 and to convey this information to a player and/or attendant. For description purposes only, verification service 600 will be described assuming that a player has a verification device 430*a* or 430*b* and is using this device directly (i.e., not through an attendant) to verify the gaming device the player is using.

Beginning with steps 602 and 604, verification server 110 may initially establish communications with the verification device and may next receive a request for verification service from the player via the verification device, as similarly described for steps 502 and 504 of verification service 500. Referring next to step 606, verification server 410 may next determine identification information associated with the player and/or gaming device. According to this embodiment of the invention, the verification server may use the identification information to store an indicator, as further disclosed herein. According to an embodiment of the invention, the verification server may determine the identification information by receiving the identification information from the verification device/player. One skilled in the art will recognize, however, that verification server 410 may determine the identification information in other fashions. Similar to verification service 500, the identification information may include, for example, player identification information, player security information, and/or information relating to the gaming device 130 the player wants to verify. One skilled in the art will recognize that the identification information may include other types of information. When the verification server receives the identification information from the verification device, the player may enter the identification information at the verification device, and/or the verification device may obtain the identification information from the gaming device and thereafter send the information to the verification server, as similarly described in relation to step 506 of verification service 500.

Referring next step 608, verification server 410 may optionally confirm for the player that the player/verification device is in communications with a licensed verification server 410, as similarly described in relation to step 508 of verification service 500.

Referring next to step 610, the verification server may next cause the verification device to prompt the player to enter at the verification device an indicator of the player's choice. At step 612, the verification server may receive the indicator from the verification device/player and may then store the indicator (step 614) in any fashion such that the indicator is associated, either directly or indirectly, with the identification information determined in step 606 and such that the indicator may be subsequently retrieved, as further disclosed herein. According to an embodiment of the invention, the verification server may store the indicator in database 180, for example, associating the indicator with the identification information and in particular, may use the identification information as an index, for example, to database 180 to store the indicator therein. For example, the verification server may store the indicator with the player's profile information.

According to another embodiment of the invention, the verification server may store the indicator in a database specific to the verification server and associate the indicator with the identification information or some other identification information that may, for example, be obtained from database 180 and the player's profile information. Again, the term "database" as used herein with respect to the verification server is not intended to limit how the indicator is stored and/or accessed by the verification server. For example, the database may be a database management system, may be a computer readable medium within verification server 410 and the indicator stored therein as a flat file, for example, may be one or more dynamic data structure within the memory of verification server 410 and the indicator stored therein, and/or some combination of these implementations and other implementations.

According to this embodiment of the invention, the indicator as specified by the player at the verification device and as received by the verification server may be any alphanumeric text value, a plurality of alphanumeric text values, an audible signal, an audible tone, an audible text value, a plurality of audible text values, or some combination thereof. Alternatively or in addition, the indicator may include player security information related to the player, such as personal information associated with the player as disclosed herein. One skilled in the art will recognize that the indicator may take other forms. Regardless of the type of indicator, the player may enter the indicator at the verification device by speaking the indicator into an audio input (such as a phone receiver), by entering the indicator via a keypad or keyboard, or by using any other of numerous input devices as disclosed herein. According to an embodiment of the invention, the verification server may store the indicator in the same form as received from the verification device/player or alternatively, may alter the form of the indicator prior to storing the indicator. For example, the verification server may receive the indicator from the verification device/player as an audible text value, convert the audible text value to an equivalent alphanumeric text value, and then store the equivalent alphanumeric text value.

Referring next to step 616, the verification server may next cause the verification device to prompt the player to enter, via the gaming device, a request for verification service and in particular, may prompt the player to enter a request, via the gaming device, to retrieve the indicator previously received from the player via the verification device. The player may make the request at the gaming device as an audible command, an audible tone (e.g., selecting an alphanumeric button on a phone), by depressing a hard button, or by selecting a soft button and/or display option made available through a display 132, for example. One skilled in the art will recognize that the player may make the request in other ways. The gaming device may send the request to the verification server either directly, or via gaming server 110.

Referring next to step 618, the verification server may receive the request from the gaming device and in response to this request, may determine the indicator previously received from the player via the verification device (step 622). According to an embodiment of the invention, verification server 410 may determine the indicator by determining identification information from the gaming device (step 620) and by using the identification information to access the database in which the verification server previously stored the indicator. For example, the verification server may use the identification information as an index, for example, to access the database.

Similar to above, the identification information may include, for example, player identification information, player security information, and/or information relating to the gaming device 130. One skilled in the art will recognize, however, that the identification information may include other types of information. According to an embodiment of the invention, the verification server may determine the identification information by receiving the identification information from the gaming device/player. For example, the player may enter the identification information at the gaming device, possibly in conjunction with entering the request for verification service and/or in response to receiving a prompt from the verification server and/or gaming device (as similarly disclosed in relation to step 506 of verification service 500, the player may obtain the identification information from the gaming device itself). Alternatively, the gaming device may automatically include the identification information with the request for verification service (e.g., the gaming device may send the player's login or a name/address of the gaming device). Alternatively, the verification server may determine the identification information based on the communications of receiving the request from the gaming device (e.g., the verification server may be able to determine a name/address associated with the gaming device). One skilled in the art will recognize that the verification server may determine the identification information in other fashions. One skilled in the art will also recognize that the identification information received from the gaming device may be the same as and/or different from the identification information received from the verification device in step 606.

As indicated, according to an embodiment of the invention, the verification server may use the determined identification information from the gaming device to now determine the indicator previously received from the player via the verification device (step 622) and in particular, may use the identification information to access the database in which the verification server previously stored the indicator. One skilled in the art will recognize that the identification information used to store the indicator in the database may be different from the identification information now used to access the database, depending on the form of the database. Assuming the verification server is not able to use the form of the identification information received from the gaming device to access the database, the verification server may convert the identification information into another useable form through, for example, database 180.

Referring now to step 624, once determining the indicator, the verification server may next send the indicator, via licensed gaming server 110, to the gaming device, causing the gaming device to make the indicator known to the player. The verification server may send the indicator to the gaming device in the same form as received from the verification device or alternatively, may alter the form of the indicator sent to the gaming device, thereby causing the gaming device to make the indicator known to the player in a different form than entered.

As such, according to this embodiment of the invention, a licensed verification server 410 stores an indicator received from a verification device/player and then upon receiving a request from the gaming device/player, sends the indicator, via licensed gaming server 110, to the gaming device/player, thereby allowing the player to verify that the gaming device is in communications with licensed gaming server 110, rather than a bogus/malicious gaming server. Notably, if the player does not receive the indicator at the gaming device or receives a different indicator than initially entered at the verification device, the player may conclude that the gaming device may not be in communications with a licensed gaming server 110 and should seek assistance.

One skilled in the art will recognize that alternative embodiments of verification service 600, similar to the alternative embodiments of verification service 500 in which a player interacts with an attendant and the attendant specifies the indicator, are also possible.

Figure 7:
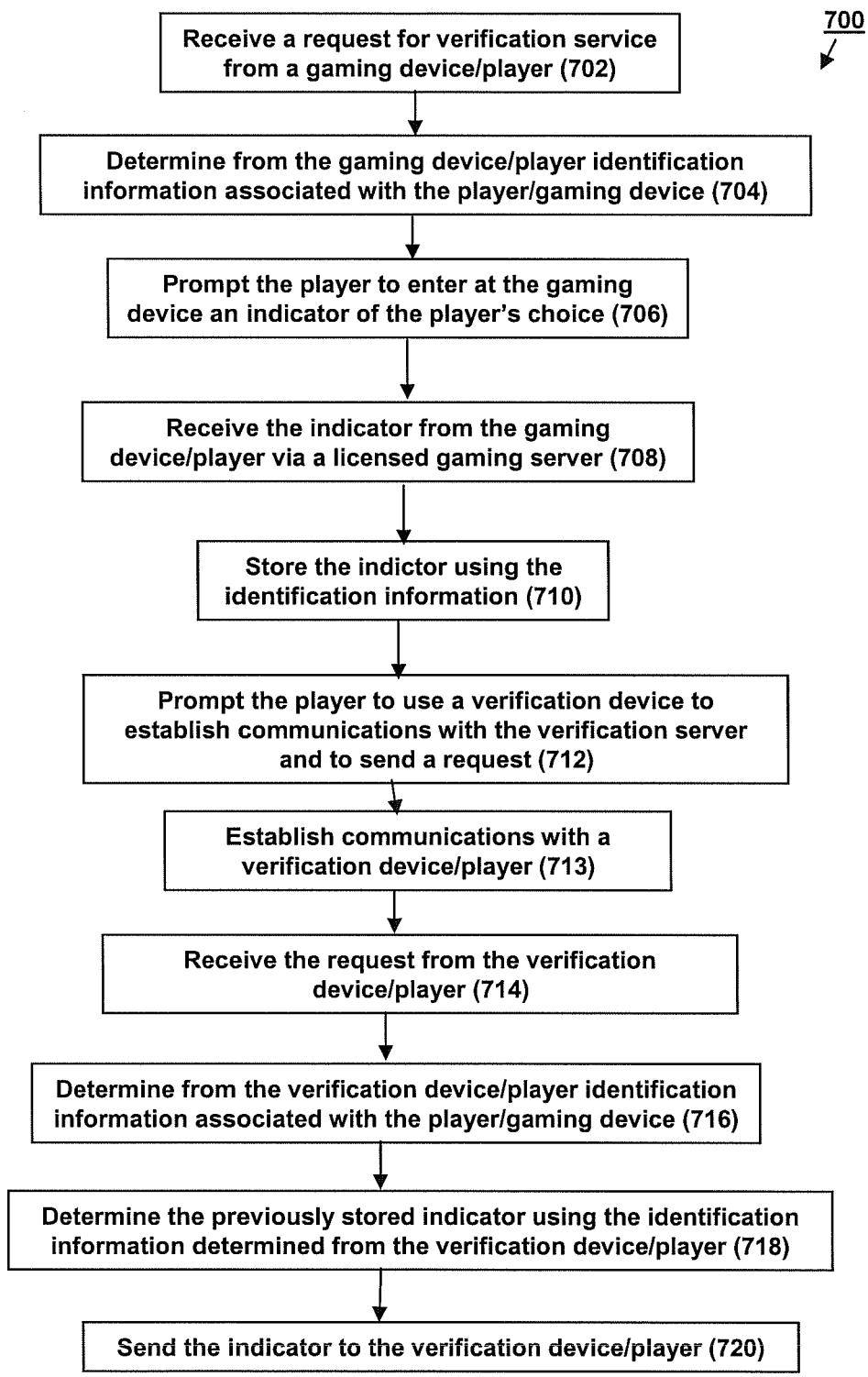
FIG. 7 shows a further verification service provided by the verification system of FIG. 4 according to an embodiment of the invention.

Referring now to FIG. 7, there is shown steps of a verification service 700 according to an embodiment of the invention, which service is provided through a combination of verification server 410, a verification device, and a gaming device. One skilled in the art will recognize that while verification service 700 is described as a sequence of ordered steps, the specific order of these steps may vary, one or more steps may be combined, and not all steps may be required.

As similarly described for verification service 500, according to this embodiment, it is assumed a player is using a gaming device 130 that is already in communications with a gaming server, presumably a licensed gaming server 110, and that if required, the player has already entered any required player identification information and/or player security information. Similar to above, the player may be at any one of various states with respect to the player's use of the gaming device. It should be noted that according to this embodiment of the invention, gaming device 130 may require one or more applications that operate in conjunction with applications 416 on the verification server to provide verification service 700.

According to this embodiment of the invention, the player may use a verification device 430*a*/430*b*/430*c* to verify the gaming device. Alternatively, the player may verify the gaming device through an attendant, which may be using any verification device 430*a*/430*c*, as similarly described above. According to this embodiment of the invention, the verification device 430*a*/430*b*/430*c* need be at least operable to receive verification information from verification server 410 and to convey this information to a player and/or attendant, but is preferably also operable to receive verification information from a player and/or attendant and to convey this information to a verification server 410. For description purposes only, verification service 700 will be described assuming that a player has a verification device 430*a* or 430*b* and is using this device directly (i.e., not through an attendant) to verify the gaming device the player is using.

Beginning with step 702, verification server 410 may initially receive a request for verification service from the player via the gaming device. The player may make the request at the gaming device as an audible command, an audible tone (e.g., selecting an alphanumeric button on a phone), by depressing a hard button, or by selecting a soft button and/or display option made available through a display 132, for example. One skilled in the art will recognize that the player may make the request in other ways. The gaming device may send the request to the verification server either directly, or via gaming server 110.

Referring next to step 704, verification server 410 may next determine from the gaming device/player identification information associated with the player and/or gaming device. According to this embodiment of the invention, the verification server may use the identification information to store an indicator received from the gaming device, as further disclosed herein. Similar to above, the identification information may include, for example, player identification information, player security information, and/or information relating to the gaming device 130, although other types of identification information may be used. According to an embodiment of the invention, the verification server may determine the identification information by receiving the identification information from the gaming device/player, as similarly disclosed in relation to step 620 of verification service 600. For example, the player may enter the identification information at the gaming device, possibly in conjunction with entering the request for verification service and/or in response to receiving a prompt from the verification server and/or gaming device. Alternatively, the gaming device may automatically include the identification information with the request for verification service. Alternatively, the verification server may determine the identification information based on the communications of receiving the request for verification service from the gaming device. One skilled in the art will recognize that the verification server may determine the identification information in other fashions.

Referring next to step 706, the verification server may next cause the gaming device to prompt the player to enter at the gaming device an indicator of the player's choice. At step 708, the verification server may next receive the indicator from the gaming device/player and preferably, may receive the indicator via the gaming server 110. Upon receiving this indicator from the gaming device/player, the verification server may store the indicator (step 710) in any fashion such that the indicator is associated, either directly or indirectly, with the identification information obtained in step 704 and such that the indicator may be subsequently retrieved, as further disclosed herein. According to an embodiment of the invention and as similarly described in relation to step 614 of verification process 600, the verification server may store the indicator in database 180, for example, associating the indicator with the identification information and in particular, using the identification information as an index, for example, to database 180 to store the indicator therein. Alternatively, the verification server may store the indicator in a database specific to the verification server and associate the indicator with the identification information or some other identification information that may, for example, be obtained from database 180 and the player's profile information.

According to this embodiment of the invention, the indicator as specified by the player at the gaming device and as received by the verification server may be any alphanumeric text value, a plurality of alphanumeric text values, an audible signal, an audible tone, an audible text value, a plurality of audible text values, or some combination thereof. Alternatively or in addition, the indicator may include player security information related to the player, such as personal information associated with the player as disclosed herein. One skilled in the art will recognize that the indicator may take other forms. Regardless of the type of indicator, the player may enter the indicator at the gaming device by speaking the indicator into an audio input, by entering the indicator via a keypad or keyboard, or by using any other of numerous input devices as disclosed herein. According to an embodiment of the invention, the verification server may store the indicator in the same form as received from the gaming device/player or alternatively, may alter the form of the indicator prior to storing the indicator, as similarly described in relation to step 614 of verification process 600.

Referring next to step 712, verification server 410 may next cause the gaming device to prompt the player to use a verification device 430*a*/430*b* to establish communications with verification server 410 and from this device make a request for verification service and in particular, make a request to retrieve the indicator previously received from the player via the gaming device. The player may perform these actions as similarly described in relation to steps 502 and 504 of verification service 500. Accordingly, at steps 713 and 714, verification server 110 may establish communications with the player's verification device and may receive a request from the verification device.

Referring next to steps 716 and 718, in response to receiving the request from the verification device, the verification server may next determine the indicator previously received from the player via the gaming device/gaming server 110 (step 718). According to an embodiment of the invention, verification server 410 may determine the indicator by determining identification information from the verification device/player (step 716) and by using this identification information to access the database in which the verification server previously stored the indicator (step 718).

According to an embodiment of the invention, the verification server may determine the identification information by receiving the identification information from the verification device/player. One skilled in the art will recognize, however, that verification server 410 may determine the identification information in other fashions. As similarly described above, the identification information may include, for example, player identification information, player security information, and/or information relating to the gaming device 130, although other types of information may be used. When the verification server receives the identification information from the verification device, the player may enter the identification information at the verification device, and/or the verification device may obtain the identification information from the gaming device and thereafter send the information to the verification server, as similarly described in relation to step 506 of verification service 500. One skilled in the art will recognize that the identification information received from the verification device may be the same as and/or different from the identification information received from the gaming device in step 704.

As an aside, one skilled in the art will also recognize that at least step 712, for example, may occur prior to step 702. One skilled in the art will also recognize that as similarly described in relation to step 508 of verification service 500, verification server 410 may also confirm for the player that the player/verification device is in communications with a licensed verification server 410 by, for example, using the identification information from the verification device to obtain player security information related to the player and thereafter sending the information to the player.

Referring again to step 718, as indicated, the verification server may use the determined identification information from the verification device to now determine the indicator previously received from the player via the gaming device and in particular, may use the identification information to access the database in which the verification server previously stored the indicator. Referring now to step 720, once determining the indicator, the verification server may next send the indicator to the verification device, causing the verification device to make the indicator known to the player. Similar to step 624 of verification service 600, the verification server may send the indicator to the verification device in the same form as received from the gaming device or alternatively, may alter the form of the indicator sent to the verification device, thereby causing the verification device to make the indicator known to the player in a different form than entered.

As such, according to this embodiment of the invention, a licensed verification server 410 stores an indicator received from a gaming device/player via licensed gaming server 110, and then upon receiving a request from a verification device, sends the indicator to the verification device/player, thereby allowing the player to verify that the gaming device is in communications with a licensed gaming server 110. Notably, if the player does not receive the indicator at the verification device or receives a different indicator than initially entered at the gaming device, the player may conclude that the gaming device may not be in communications with a licensed gaming server 110 and should seek assistance.

Figure 8:
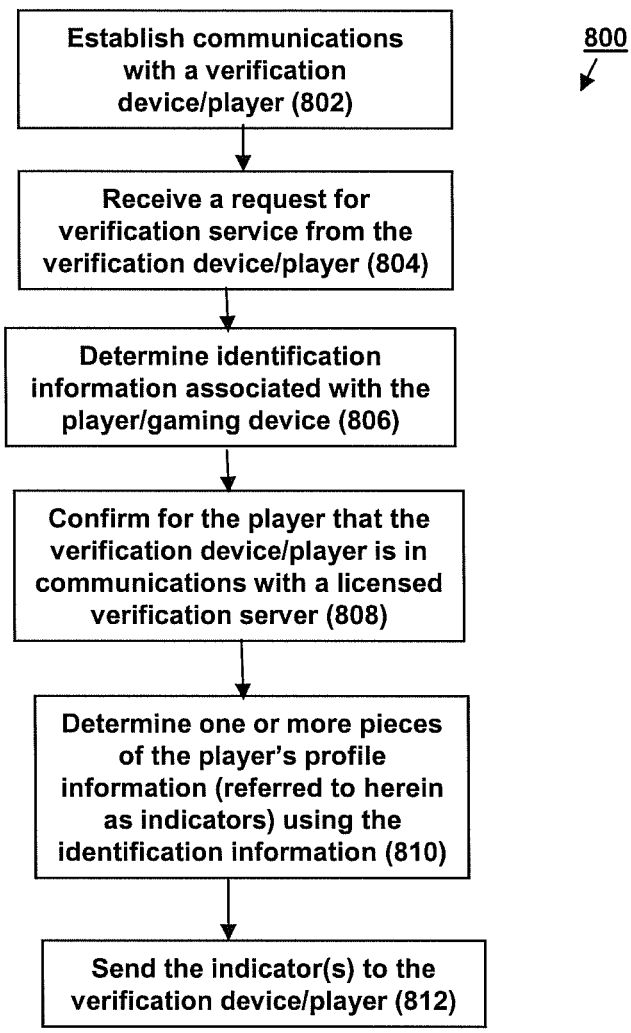
FIG. 8 shows another verification service provided by the verification system of FIG. 4 according to an embodiment of the invention.

Referring now to FIG. 8, there is shown steps of a verification service 800 according to another embodiment of the invention, which service is provided through a combination of verification server 410 and a verification device. According to this embodiment of the invention, verification server 410 does not exchange verification information with the gaming device to be verified, unlike verification services 500, 600, and 700. One skilled in the art will recognize that while verification service 800 is described as a sequence of ordered steps, the specific order of these steps may vary, one or more steps may be combined, and not all steps may be required.

According to this embodiment of the invention, it is assumed a player is using a gaming device 130 that is in communications with a gaming server, presumably a licensed gaming server 110, and that the player is currently engaged in one or more gaming activities and/or convenience services, and/or that the player has completed one or more gaming activities and/or convenience services. Alternatively, it is assumed that the player may have completed one or more gaming activities and/or convenience services and has turned off and/or logged out of the gaming device. According to this embodiment of the invention, the player may now want to verify that the gaming device the player is currently using or has completed using is/was in fact in communications with a licensed gaming server 110, rather than a bogus/malicious gaming server.

As disclosed herein, a licensed gaming server 110, for example, may monitor a player's actions and may maintain as part of the player's profile information in database 180, for example, information associated with one or more gaming activities engaged in by a player, information associated with one or more convenience services engaged in by a player, and/or credit information of the player. According to this embodiment of the invention, a player may use a verification device 430a/430b/430c, either directly or through an attendant, to access such player profile information and by doing such, may verify that the information is consistent with what the player feels the information should be. If the information appears accurate, the player may conclude that the gaming device the player is currently using, or was using, is/was in communications with a licensed gaming server 110. Alternatively, if the information does not appear accurate, the player may conclude that the gaming device is/was not in communications with a licensed gaming server 110 and should seek assistance.

According to this embodiment of the invention, the verification device 430a/430b/430c need be at least operable to receive verification information from verification server 410 and to convey this information to a player and/or attendant, but is preferably also operable to receive verification information from a player and/or attendant and to convey this information to a verification server 410. For description purposes only, verification service 800 will be described assuming that a player has a verification device 430a or 430b and is using this device directly (i.e., not through an attendant) to verify the gaming device.

Beginning with steps 802 and 804, verification server 410 may initially establish communications via communications network 450 with the verification device and may next receive a request for a verification service from the player via the verification device, as similarly described in relation to steps 502 and 504 of verification service 500. Referring next to step 806, verification server 410 may next determine identification information associated with the player and/or gaming device, such as player identification information, player security information, and/or information relating to the gaming device 130 as disclosed herein, although other types of information may be determined. According to this embodiment of the invention, the verification server may use the identification information to access database 180, for example, and in particular, may use the identification information to obtain player profile information, as further disclosed herein. According to an embodiment of the invention, the verification server may determine the identification information by receiving the identification information from the verification device/player, as similarly described in relation to step 506 of verification service 500, for example. One skilled in the art will recognize, however, that verification server 410 may determine the identification information in other fashions.

Referring to step 808, verification server 410 may next confirm for the player that the player/verification device is in communications with a licensed verification server 410, as similarly described in relation to step 508 of verification service 500.

Referring next to step 810, verification server 410 may use the identification information to determine one or more indicators and in particular, may use the identification information as an index, for example, to database 180 in order to access the player's profile information and thereby determine one or more indicators. Specifically, as indicated, the player's profile information may include, for example, information associated with one or more gaming activities engaged in by a player (e.g., the name of the gaming activity currently engaged in by the player), information associated with one or more convenience services engaged in by a player (e.g., an item purchased by the player), and/or credit information of the player (e.g., a credit amount of the player). According to an embodiment of the invention, the verification server may use the identification information as an index to database 180 in order to access the player's profile information and may thereafter automatically select one or more predetermined pieces of the above described information (or other types of information), which information may be generally referred to in the context of this embodiment as one or more indicators. According to another embodiment of the invention, the verification server and/or verification device may prompt the player (e.g., through an audible, textual, and/or graphical prompt) and/or present the player with one or more options as to the type(s) of information the player would like to access from the player's profile information in database 180. The verification server may thereafter receive the player's selection(s) and select one or more pieces of the player's profile information (i.e., indicator(s)) based on these selection(s).

Referring next to step 812, verification server 410 may send the accessed information (i.e., indicator(s)) to the verification device, causing the verification device to make the information known to the player as audible values, textual values, etc. As indicated above, if the information appears accurate, the player may conclude that gaming device the player is currently using, or was using, is/was in communications with a licensed gaming server 110. Alternatively, if the information does not appear accurate, the player may conclude that the gaming device is/was not in communications with a licensed gaming server 110 and should seek assistance.

Figure 9:
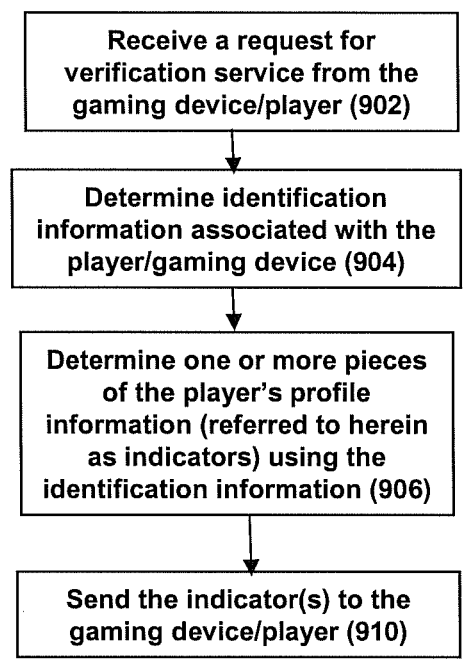
FIG. 9 shows a further verification service provided by the verification system of FIG. 4 according to an embodiment of the invention.

Referring now to FIG. 9, there is shown steps of a verification service 900 according to another embodiment of the invention, which service is provided through a combination of verification server 410 and a gaming device. According to this embodiment of the invention, verification server 410 does not exchange verification information with a verification device, unlike verification services 500, 600, 700, and 800. In other words, according to this embodiment of the invention, a verification device may not be needed to verify a gaming device. One skilled in the art will recognize that while verification service 900 is described as a sequence of ordered steps, the specific order of these steps may vary, one or more steps may be combined, and not all steps may be required.

As similarly described for verification service 500, according to this embodiment, it is assumed a player is using a gaming device 130 that is already in communications with a gaming server, presumably a licensed gaming server 110, and that if required, the player has already entered any required player identification information and/or player security information. Similar to above, the player may be at any one of various states with respect to the player's use of the gaming device. It should be noted that according to this embodiment of the invention, gaming device 130 may require one or more applications that operate in conjunction with applications 416 on the verification server to provide verification service 900.

Beginning with step 902 of verification service 900, verification server 410 may initially receive a request for verification service from the player via the gaming device. The player may make the request at the gaming device as an audible command, an audible tone (e.g., selecting an alphanumeric button on a phone), by depressing a hard button, or by selecting a soft button and/or display option made available through a display 132, for example. One skilled in the art will recognize that the player may make the request in other ways. The gaming device may send the request to the verification server either directly, or via gaming server 110.

Referring next to step 904, verification server 410 may next determine identification information associated with the player and/or gaming device, such as player identification information, player security information, and/or information relating to the gaming device 130 as disclosed herein, although other types of information may be determined. According to this embodiment of the invention, the verification server may use the identification information to access database 180, for example, and in particular, may use the identification information to obtain player profile information, as further disclosed herein. According to an embodiment of the invention, the verification server may determine the identification information by receiving the identification information from the gaming device/player, as similarly described in relation to step 620 of verification service 600, for example. One skilled in the art will recognize, however, that verification server 410 may determine the identification information in other fashions.

Referring to step 906, verification server 410 may next use the identification information to determine one or more indicators and in particular, may use the identification information as an index, for example, to database 180 in order to access the player's profile information and thereby determine one or more indicators. As disclosed herein, the player's profile information may include player security information related to the player, such as personal information associated with the player (e.g., the player's maiden name, a name of the player's pet, etc) and/or a random value specified by the player. According to an embodiment of the invention and as disclosed herein, a player may specify some or all of the player security information during a registration period prior to the start of any gaming activity and/or engaging in any convenience services.

According to an embodiment of the invention, the verification server may use the identification information as an index to database 180 in order to access the player's profile information and may thereafter automatically select one or more pieces of the above described information (or other types of information), which information may be generally referred to in the context of this embodiment as one or more indicators. According to another embodiment of the invention, the verification server and/or gaming device may prompt the player and/or present the player with one or more options as to the type(s) of information the player would like to access from the player's profile information in database 180. The verification server may thereafter receive the player's selection(s) and select one or more pieces of the player's profile information (i.e., indicator(s)) based on these selection(s).

Referring next to step 908, the verification server may send the accessed information (i.e., indicator(s)) to the gaming device via the gaming server 110, causing the gaming device to make the information known to the player as audible values, textual values, etc. As an example, when the verification server automatically accesses the information and presents the information to the player, the information may be presented as: "Your maiden name is: Smith", for example. Alternatively, if the player is able to select the type(s) of information to be accessed, in response to the player selecting, "What is your maiden name?", for example, the verification serve may respond with "Smith".

According to this embodiment of the invention, by having the player specify player security information during a registration period prior to the start of any gaming activity and/or engaging in any convenience services and by then allowing the player to access such information from the gaming device, the player may conclude that when the accessed information is accurate, the gaming device the player is currently using is in communications with a licensed gaming server 110. Alternatively, if the information is not accurate, the player may conclude that the gaming device is not in communications with a licensed gaming server 110 and should seek assistance.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method, performed by at least one processor of a mobile device, comprising:
   via a communications module coupled to the mobile device, transmitting and receiving gaming and convenience services information to a gaming server, in which the convenience services information comprises a non-gaming related service;
   displaying, on a display of the mobile device, textual and graphical data related to the gaming and convenience services information;
   obtaining and transmitting to a verification server at least one user data pertaining to a user, in which the user data is obtained via an input device that is coupled to the mobile device;
   receiving, from the verification server, verification based on the at least one user data that the user is permitted to play a requested game and permitted to purchase at least one convenience service;
   receiving, from the verification server, verification of the authenticity of one or more gaming applications provided by the gaming server;
   transmitting, to the gaming server, information to be stored at the gaming server, the transmitted information comprises an indicator comprising at least one of: gaming activity information of the requested game played on the mobile device, gaming device information, and player profile information;
   obtaining from the verification device the information from the gaming server; and comparing the transmitted information with the obtained information, wherein verification of communication between the mobile device and the gaming server is based on the transmitted information being the same as the obtained information or instructing the mobile device to seek assistance based on the transmitted information not being the same as the obtained information.

2. The method of claim 1, in which the mobile device comprises at least one of:
a POTS phone, a cellular phone, an IP phone, a personal computing device, a pocket personal computer, a PDA, a kiosk, a terminal, and an output device to the computing device.

3. The method of claim 1, in which the mobile device provides at least one gaming activity to a player using the mobile device.

4. The method of claim 3, in which the mobile device provides the at least one gaming activity together with the gaming server.

5. The method of claim 4, in which the at least one gaming activity comprises at least one of:
a gambling activity,
wagering on an event,
a lottery activity, and
a non-gambling activity.

6. The method of claim 3, in which the mobile device also provides to the player at least one convenience service.

7. The method of claim 6, in which the at least one convenience service comprises at least one of:
a restaurant service,
an entertainment service,
a hotel service,
a money management service,
a news service, and
a financial exchange service.

8. The method of claim 1, in which the gaming server provides through the mobile device at least one gaming activity to a player using the mobile device.

9. The method of claim 8, in which the gaming server also provide through the mobile device at least one convenience service to the player.

10. The method of claim 1 in which the indicator comprises at least one of:
an alphanumeric text value,
a plurality of alphanumeric text values,
an audible text value, and
a plurality of audible text values.

11. The method of claim 1, in which the indicator comprises information associated with one or more gaming activities engaged in by a player of the mobile device.

12. The method of claim 1, in which the indicator comprises at least one of:
a name of a gaming activity currently engaged in by a player of the mobile device,
a location at which the player is currently engaged in a gaming activity,
an obtained skill level of a gaming activity currently engaged in by the player,
an amount wagered in a gaming activity currently engaged in by the player,
a monetary outcome in a gaming activity currently engaged in by the player,
a win-lose outcome in a gaming activity currently engaged in by the player, and
a sequence of events in a gaming activity currently engaged in by the player.

13. The method of claim 1, in which the indicator comprises at least one of:
a name of any gaming activity previously engaged in by a player of the mobile device,
a location at which the player previously engaged in any gaming activity,
an obtained skill level of any gaming activity previously engaged in by the player,
an amount wagered in any gaming activity previously engaged in by the player,
a monetary outcome in any gaming activity previously engaged in by the player,
a win-lose outcome in any gaming activity previously engaged in by the player, and
a sequence of events in any gaming activity previously engaged in by the player.

14. The method of claim 1, in which the indicator comprises at least one of:
a sequence of names of one or more gaming activities as engaged in by a player of the mobile device,
a sequence of locations at which the player engaged in one or more gaming activities,
an average volume wagered by the player in connection with one or more gaming activities engaged in by the player,
a sequence of wagered amounts by the player in connection with one or more gaming activities engaged in by the player,
a sequence of win-lose outcomes in connection with one or more gaming activities engaged in by the player, and
a sequence of monetary outcomes in connection with one or more gaming activities engaged in by the player.

15. The method of claim 1, in which the indicator comprises information associated with one or more convenience services engaged in by a player of the mobile device.

16. The method of claim 1, in which the indicator comprises at least one of:
a reservation made by a player of the mobile device,
an appointment made by the player,
an item purchased by the player,
a cost of an item purchased by the player, and
a deposit amount associated with a reservation made by the player.

17. The method of claim 1, in which the indicator comprises credit information associated with a player of the mobile device.

18. The method of claim 1, in which the indicator comprises at least a transaction history of a credit account of the player.

19. The method of claim 18, comprising use of the transaction history of a credit account of the player to establish one or more gaming limits for a gaming player.

20. The method of claim 1, in which the indicator comprises information obtained by the gaming server as a result of a player of the mobile device engaging in one or more gaming activities.

21. The method of claim 1, further comprising storing the indicator as a player of the mobile device engages in one or more gaming activities.

22. The method of claim 1, in which determining the indicator comprises using identification information to determine the indicator.

23. The method of claim 22, in which using the identification information to determine the indicator comprises accessing a database based on the identification information to determine the indicator.

24. The method of claim 23, in which the identification information comprises at least one of:
- a name of a player using the mobile device,
- security information associated with the player using the mobile device,
- a tracking value assigned to the mobile device, and
- a name assigned to the mobile device.

25. The method of claim 1, in which determining the indicator comprises:
- receiving from the verification server a selection as to a type of indicator; and
- using identification information and the selection to determine the indicator.

26. The method of claim 1, further comprising receiving from the verification server verification that the mobile device is in communications with a licensed server.

27. A mobile device comprising:
- at least one processor; and
- a memory electronically coupled to the at least processor and having instructions stored thereon that when executed by the at least one processor direct the at least one processor to:
  - via a communications module coupled to the mobile device, transmit and receive gaming and convenience services information to a gaming server, in which the convenience services information comprises a non-gaming related service;
  - display, on a display of the mobile device, textual and graphical data related to the gaming and convenience services information;
  - obtain and transmit to a verification server at least one user data pertaining to a user, in which the user data is obtained via an input device that is coupled to the mobile device;
  - receive, from the verification server, verification based on the at least one user data that the user is permitted to play a requested game and permitted to purchase at least one convenience service; and
  - receive, from the verification server, verification of the authenticity of one or more gaming applications provided by the gaming server;
  - transmit, to the gaming server, information to be stored at the gaming server, the transmitted information comprise an indicator comprising at least one of: gaming activity information of the requested game played on the mobile device, gaming device information, and player profile information;
  - obtain from a verification device the information that is stored at the gaming server; and
  - compare the transmitted information with the obtained information, wherein verification of communication between the mobile device and the gaming server is based on the transmitted information being the same as the obtained information or instructing the mobile device to seek assistance based on the transmitted information not being the same as the obtained information.

28. A non-transitory, computer-readable memory, having instructions thereon that when executed by at least one processor of a mobile device to direct the at least one processor of the mobile device to:
- via a communications module coupled to the mobile device, transmit and receive gaming and convenience services information to a gaming server, in which the convenience services information comprises a non-gaming related service;
- display, on a display of the mobile device, textual and graphical data related to the gaming and convenience services information;
- obtain and transmit to a verification server at least one user data pertaining to a user, in which the user data is obtained via a user input device that is coupled to the mobile device;
- receive, from the verification server, verification based on the at least one user data that the user is permitted to play a requested game and permitted to purchase at least one convenience service;
- receive, from the verification server, verification that the mobile device is in communications with a licensed server;
- transmit, to the gaming server, information to be stored at the gaming server, the stored information comprises an indicator comprising at least one of: gaming activity information of the requested game played on the mobile device, gaming device information, and player profile information;
- obtain from the verification device the stored information from the gaming server; and
- compare the stored information with the received information, wherein verification of communication between the mobile device and the gaming server is based on the transmitted information being the same as the obtained information or instructing the mobile device to seek assistance based on the transmitted information not being the same as the obtained information.

* * * * *